US012164239B2

(12) United States Patent
Watanabe

(10) Patent No.: US 12,164,239 B2
(45) Date of Patent: Dec. 10, 2024

(54) IMAGE FORMING APPARATUS THAT MODULATES DISCHARGING LIGHT QUANTITY

(71) Applicant: CANON KABUSHIKI KAISHA, Tokyo (JP)

(72) Inventor: Shinri Watanabe, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/122,353

(22) Filed: Mar. 16, 2023

(65) Prior Publication Data

US 2023/0297002 A1 Sep. 21, 2023

(30) Foreign Application Priority Data

Mar. 17, 2022 (JP) ................................ 2022-042223

(51) Int. Cl.
*G03G 15/02* (2006.01)
*G03G 21/00* (2006.01)
*G03G 21/08* (2006.01)

(52) U.S. Cl.
CPC ..... *G03G 15/0275* (2013.01); *G03G 15/0266* (2013.01); *G03G 21/08* (2013.01)

(58) Field of Classification Search
CPC ........... G03G 15/0189; G03G 15/0266; G03G 15/0275; G03G 21/0064; G03G 21/0094; G03G 21/06; G03G 21/08
See application file for complete search history.

(56) References Cited

U.S. PATENT DOCUMENTS

2006/0233572 A1 10/2006 Ogawa et al.
2012/0237250 A1* 9/2012 Higa .................. G03G 15/5054 399/96
2019/0265625 A1* 8/2019 Okubo ............... G03G 15/0266
2019/0302638 A1 10/2019 Tanaka et al.

FOREIGN PATENT DOCUMENTS

JP 2001-142365 A 5/2001
JP 2006-301108 A 11/2006
JP 2011-33774 A 2/2011
JP 2016-126252 A 7/2016
JP 2016-218155 A 12/2016
JP 2017-58433 A 3/2017
JP 2019-12189 A 1/2019
JP 2019-174765 A 10/2019

* cited by examiner

*Primary Examiner* — Sophia S Chen
(74) *Attorney, Agent, or Firm* — Venable LLP

(57) ABSTRACT

An image forming apparatus includes a first image forming portion, a second image forming portion, a power source portion, and a controller. The power source portion is constituted so that when the power source portion applies a charging voltage to a first charging member of the first image forming portion, the charging voltage is also applied to a second charging member of the second image forming portion. The controller carries out control so that an emitted light quantity of a light emitting element is changed from a first light quantity to a second light quantity larger than the first light quantity and is changed from the second light quantity to a third light quantity larger than the second light quantity.

20 Claims, 11 Drawing Sheets

IMAGE FORMING APPARATUS THAT MODULATES DISCHARGING LIGHT QUANTITY

FIELD OF THE INVENTION AND RELATED ART

The present invention relates to an image forming apparatus, such as a copying machine or a printer, of an electrophotographic type.

In the image forming apparatus, such as the copying machine or the printer, of the electrophotographic type, on a photosensitive drum electrically charged to a uniform potential by a charging means, an electrostatic latent image is formed by irradiating a surface of the photosensitive drum with light depending on image data. Then, toner as a developer is deposited by a developing means on the electrostatic latent image formed on the photosensitive drum, so that the electrostatic latent image is visualized (developed) and thus a toner image is formed.

Thereafter, the toner image formed on the photosensitive drum is transferred onto a recording material such as recording paper by a transfer means and then is fixed on the recording material by a fixing device, so that desired image formation is carried out.

In a color image forming apparatus, toner images different in color are formed on photosensitive drums in image forming portions provided for associated toner colors, respectively, and are successively transferred superposedly onto the same recording material, so that a color image is formed on the recording material. For that reason, in general, a charging device provided for charging the photosensitive drum to a uniform potential in each of the image forming portions and a power source device for supplying power to the charging device of each of the image forming portions are needed. As one of means for realizing downsizing and cost reduction of the image forming apparatus, for example, in Japanese Laid-Open Patent Application (JP-A) 2016-126252, a technique such that power is supplied from a common power source device to a plurality of charging devices is proposed.

Further, from viewpoints that an image forming apparatus is downsized and that waste is eliminated, for example, in JP-A 2006-301108, a cleaner-less system (toner recycle system) is proposed. In the cleaner-less system, a constitution in which a dedicated drum cleaner as a cleaning means for removing toner remaining on a photosensitive drum after a transfer step in which the toner image is transferred onto the recording material is eliminated is employed. In the cleaner-less system, transfer residual toner remaining on the photosensitive drum after the transfer step is removed by subjecting the surface of the photosensitive drum to cleaning simultaneously with development of the electrostatic latent image by a developing means ("simultaneous development and cleaning") so that the transfer residual toner is collected in the developing means and then can be re-utilized.

The transfer residual toner principally includes toner charged to a positive polarity which is an opposite polarity to a negative polarity which is a normal charge polarity as a charge polarity thereof and includes toner which is charged to the negative polarity which is the normal charge polarity but which does not have sufficient electric charges, and the like toner. In the constitution of the cleaner-less system in which the simultaneous development and cleaning is performed, there is a need to suppress that the transfer residual toner is deposited on a charging roller charged to the negative polarity. For that reason, for example, in an image forming apparatus in JP-A 2019-174765, with respect to a rotational direction of the photosensitive drum, a pre-charging exposure device is provided on a side downstream of a contact portion where the photosensitive drum and a transfer roller are in contact with each other and upstream of a contact portion where the photosensitive drum and the charging roller are in contact with each other. The pre-charging exposure device is a device for discharging (removing a potential of) the surface of the photosensitive drum by irradiating the photosensitive drum surface with light (hereinafter, referred to as "pre-charging exposure"), and discharges the surface of the photosensitive drum by the pre-charging exposure, so that a potential difference between the photosensitive drum and the charging roller is made large. As a result, electric discharge occurs between the photosensitive drum and the charging roller, so that it becomes possible to charge the transfer residual toner to the negative polarity uniformly. By this, in the image forming apparatus provided with the cleaner-less system, deposition of the transfer residual toner onto the charging roller can be suppressed.

Further, in the case where there is an electric charge on the photosensitive drum, a surface potential of the photosensitive drum is in a disturbed state, and therefore, particularly in a low-humidity environment, an image defect called a drum ghost occurs in some instances due to a potential difference potential on the photosensitive drum in a rotation cyclic period of the photosensitive drum (member). In order to suppress the drum ghost. For example, in JP-A 2001-142365, a pre-charging exposure device in which after the transfer step and before a charging step by the charging roller, the surface potential of the photosensitive drum is removed (discharged) to a predetermined residual potential level by irradiating the surface of the photosensitive drum with light is proposed. Further, for example, in JP-A 2017-58433, a discharging constitution in which during pre-charging exposure, the light with which the photosensitive drum surface is irradiated is guided via a light guiding member such as a light guide and thus the surface potential of the photosensitive drum with respect to a rotational axis direction after the discharge is made uniform is proposed.

However, in the constitution of the cleaner-less system, in order to suppress generation of the deposition of the transfer residual toner onto the charging roller and the drum ghost, in the case where the pre-charging exposure by the pre-charging exposure device is carried out, there is a need that the light is uniformly emitted with respect to the rotational axis direction of the photosensitive drum 1. FIG. 11 is a timing chart showing states of the pre-charging exposure devices, the photosensitive drums, and the charging voltage during a printing operation of a color image forming apparatus. In FIG. 11, 101_y_, 101_m_, 101_c_, and 101_k_ show pre-charging exposure light quantities of light emitting elements (light emitting devices) of the pre-charging exposure devices provided in the image forming portions different in color. Further, 102_y_, 102_m_, 102_c_, and 102_k_ show transitions of surface potentials of the photosensitive drums, in the neighborhood of associated exposure portions, irradiated with light by the pre-charging exposure devices in the image forming portions. Further, 103 shows an output waveform of the charging voltage outputted from a power source device. Further, 104_y_, 104_m_, 104_c_, and 104_k_ show timings when image forming regions on the photosensitive drums are irradiated with laser light beams depending on image data of the image forming portions.

When the pre-charging exposure by the pre-charging exposure device is performed, as shown in 102_y_, 102_m_,

102*c*, and 102*k* of FIG. 11, the surface potentials of the photosensitive drums are abruptly displaced from −300 V to −150 V before and after the pre-charging exposure. In the following, the abrupt displacements of the surface potentials of the photosensitive drums before and after the pre-charging exposure are referred to as "load fluctuation". For that reason, when an irradiated portion on the photosensitive drum irradiated with the light by the pre-charging exposure device reaches an adjacent portion to the charging roller, a high-voltage power source supplying electric power to the charging roller cannot follow the load fluctuation of the photosensitive drum, so that output of the charging voltage fluctuates. As a result, a voltage level of the charging voltage of the high-voltage power source supplying the voltage to the charging roller becomes unstable in some cases. Particularly, in the color image forming apparatus with a constitution such that the charging voltage which is supplied from the high-voltage power source and which is applied to the charging roller is used in common for the plurality of image forming portions, the following phenomenon occurs. That is, an output fluctuation of the charging voltage generates due to the load fluctuation of the photosensitive drum in the associated image forming portion in which the pre-charging exposure by the pre-charging exposure device is performed. Then, the output of the charging voltage applied to the charging roller of each of other image forming portions fluctuates at timings indicated by Dy1, Dm1, Dc1, Dy2, Dm2, and Dc2. Here, each of Dy1, Dm1, Dc1, Dy2, Dm2, and Dc2 is the timing when the light irradiated portion on the associated photosensitive drum in the image forming portion by the pre-charging exposure reaches a contact portion thereof with the charging roller. As a result, a uniform potential state for forming an image on the photosensitive drum surface (hereinafter, this potential is referred to as "background potential") fluctuates, so that there is a problem such that density non-uniformity occurs on the image formed on the photosensitive drum of each of the image forming portions.

SUMMARY OF THE INVENTION

The present invention has been accomplished in such circumstances. A principal object of the present invention is to suppress a fluctuation in charging voltage with displacement of a surface potential of a photosensitive drum by pre-charging exposure.

According to an aspect of the present invention, there is provided an image forming apparatus comprising: a first image forming portion including a first photosensitive member, a first charging member configured to electrically charge a surface of the first photosensitive member, a first developing portion configured to develop an electrostatic latent image formed on the first photosensitive member to form a toner image, a first transfer portion configured to transfer the toner image from the first photosensitive member onto a toner image receiving member, and a first discharging portion including a light emitting element and configured to discharge the surface of the first photosensitive member by irradiating the surface of the first photosensitive member with light emitted from the light emitting element; a second image forming portion including a second photosensitive member, a second charging member configured to electrically charge a surface of the second photosensitive member, a second developing portion configured to develop an electrostatic latent image formed on the second photosensitive member to form a toner image, a second transfer portion configured to transfer the toner image from the second photosensitive member onto a toner image receiving member, and a second discharging portion including a light emitting element and configured to discharge the surface of the second photosensitive member by irradiating the surface of the second photosensitive member with light emitted from the light emitting element; a power source portion configured to apply a charging voltage to the first charging member and the second charging member; and a controller configured to control the first discharging member and the second discharging member, wherein the power source portion is constituted so that when the power source portion applies the charging voltage to the first charging member, the charging voltage is also applied to the second charging member, and wherein the controller carries out control so that an emitted light quantity of the light emitting element is changed from a first light quantity to a second light quantity larger than the first light quantity and is changed from the second light quantity to a third light quantity larger than the second light quantity.

According to another aspect of the present invention, there is provided an image forming apparatus comprising: a first image forming portion including a first photosensitive member, a first charging member configured to electrically charge a surface of the first photosensitive member, a first developing portion configured to develop an electrostatic latent image formed on the first photosensitive member to form a toner image, a first transfer portion configured to transfer the toner image from the first photosensitive member onto a toner image receiving member, and a first discharging portion including a light emitting element and configured to discharge the surface of the first photosensitive member by irradiating the surface of the first photosensitive member with light emitted from the light emitting element; a second image forming portion including a second photosensitive member, a second charging member configured to electrically charge a surface of the second photosensitive member, a second developing portion configured to develop an electrostatic latent image formed on the second photosensitive member to form a toner image, a second transfer portion configured to transfer the toner image from the second photosensitive member onto a toner image receiving member, and a second discharging portion including a light emitting element and configured to discharge the surface of the second photosensitive member by irradiating the surface of the second photosensitive member with light emitted from the light emitting element; a power source portion configured to apply a charging voltage to the first charging member and the second charging member; and a controller configured to control the first discharging member and the second discharging member, wherein the power source portion is constituted so that when the power source portion applies the charging voltage to the first charging member, the charging voltage is also applied to the second charging member, and wherein the controller carries out control so that an emitted light quantity of the light emitting element is changed from a first light quantity to a second light quantity smaller than the first light quantity and is changed from the second light quantity to a third light quantity smaller than the second light quantity.

Further features of the present invention will become apparent from the following description of exemplary embodiments with reference to the attached drawings.

Figure 4:
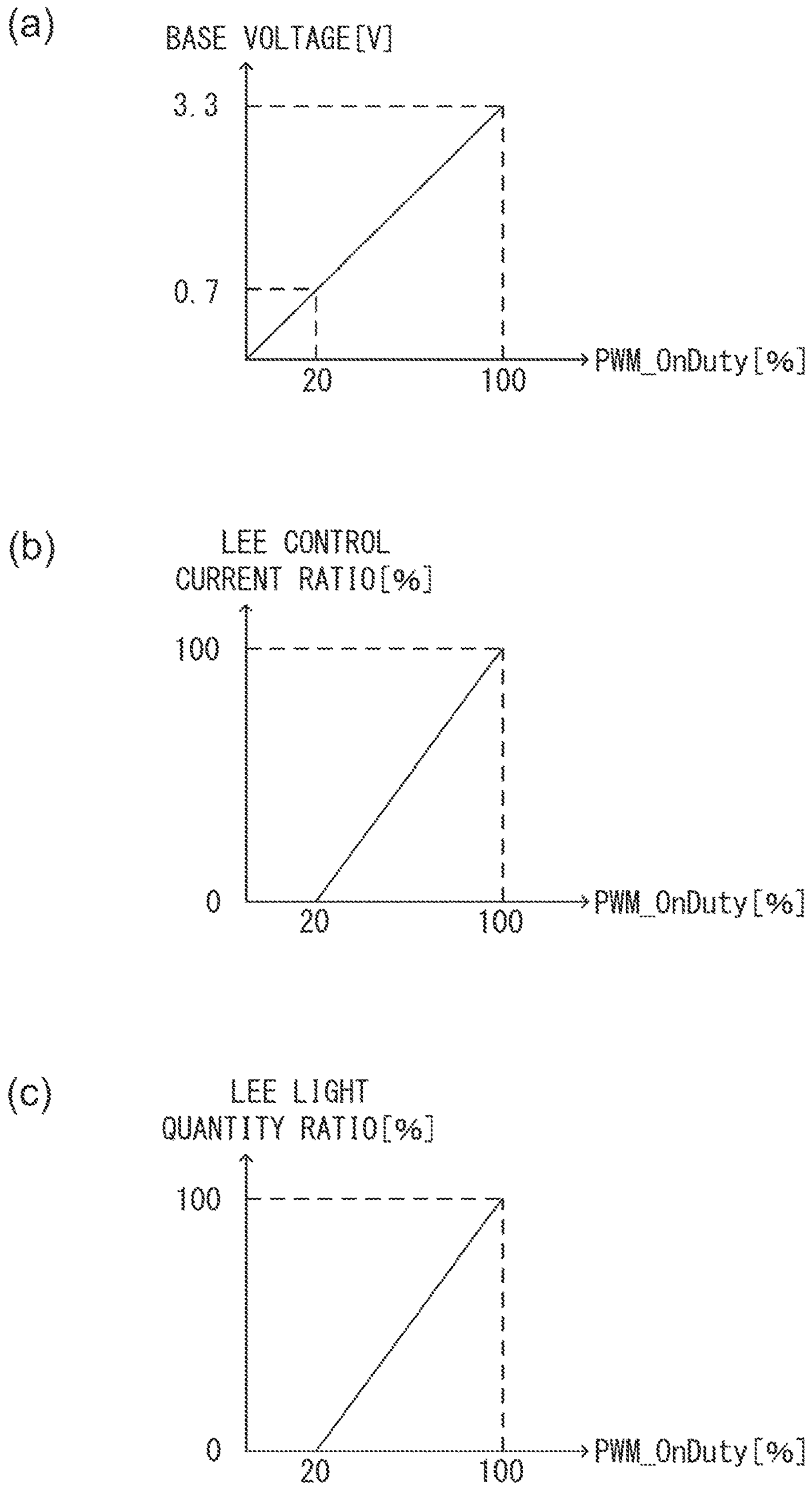

Parts (a) to (c) of FIG. 4 are graphs each for illustrating a circuit characteristic of the light emission control circuit in the embodiments 1 and 2.

Figure 5:
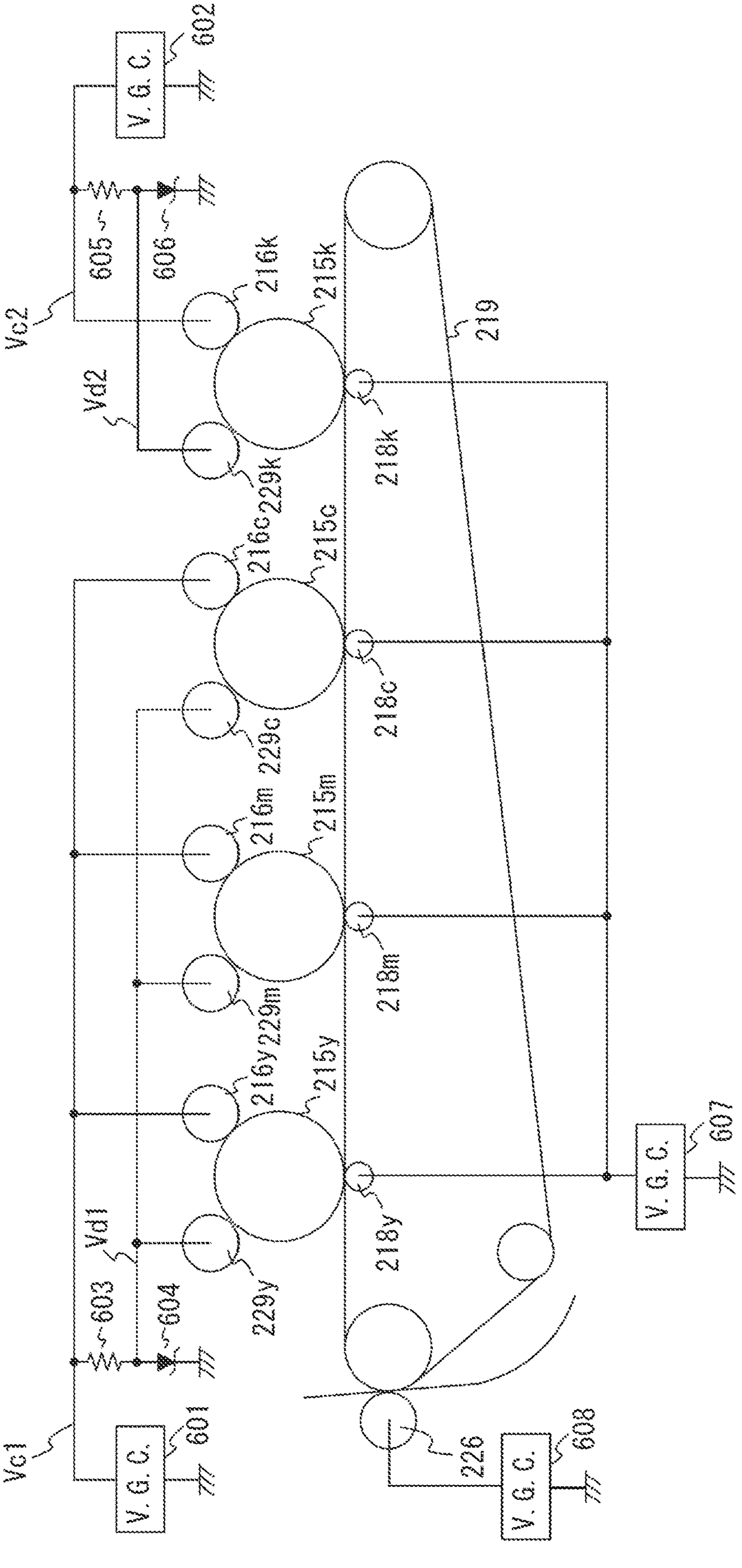

FIG. 5 is a schematic view for illustrating a constitution of a high-voltage power source of the image forming apparatus of the embodiments 1 and 2.

Figure 6:
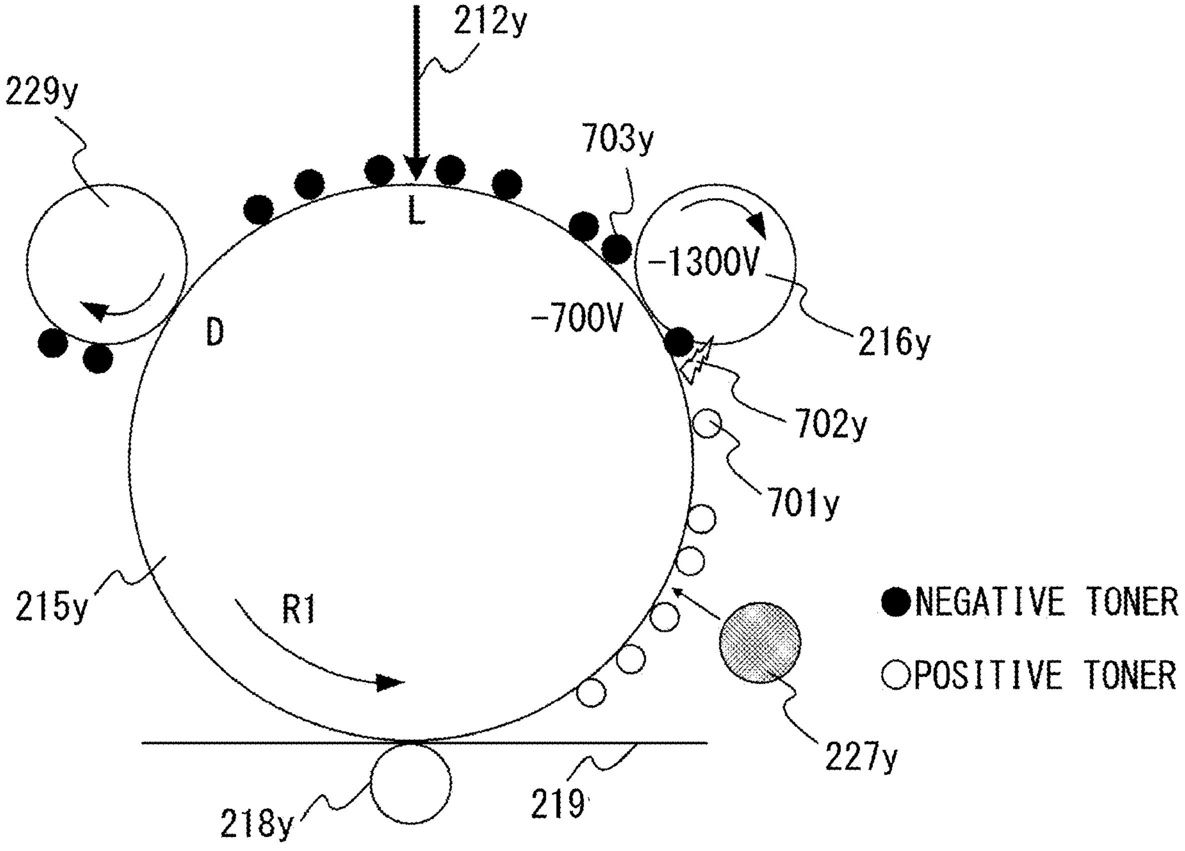

FIG. 6 is a schematic view for illustrating an outline of a cleaner-less system in the embodiments 1 and 2.

Figure 7:
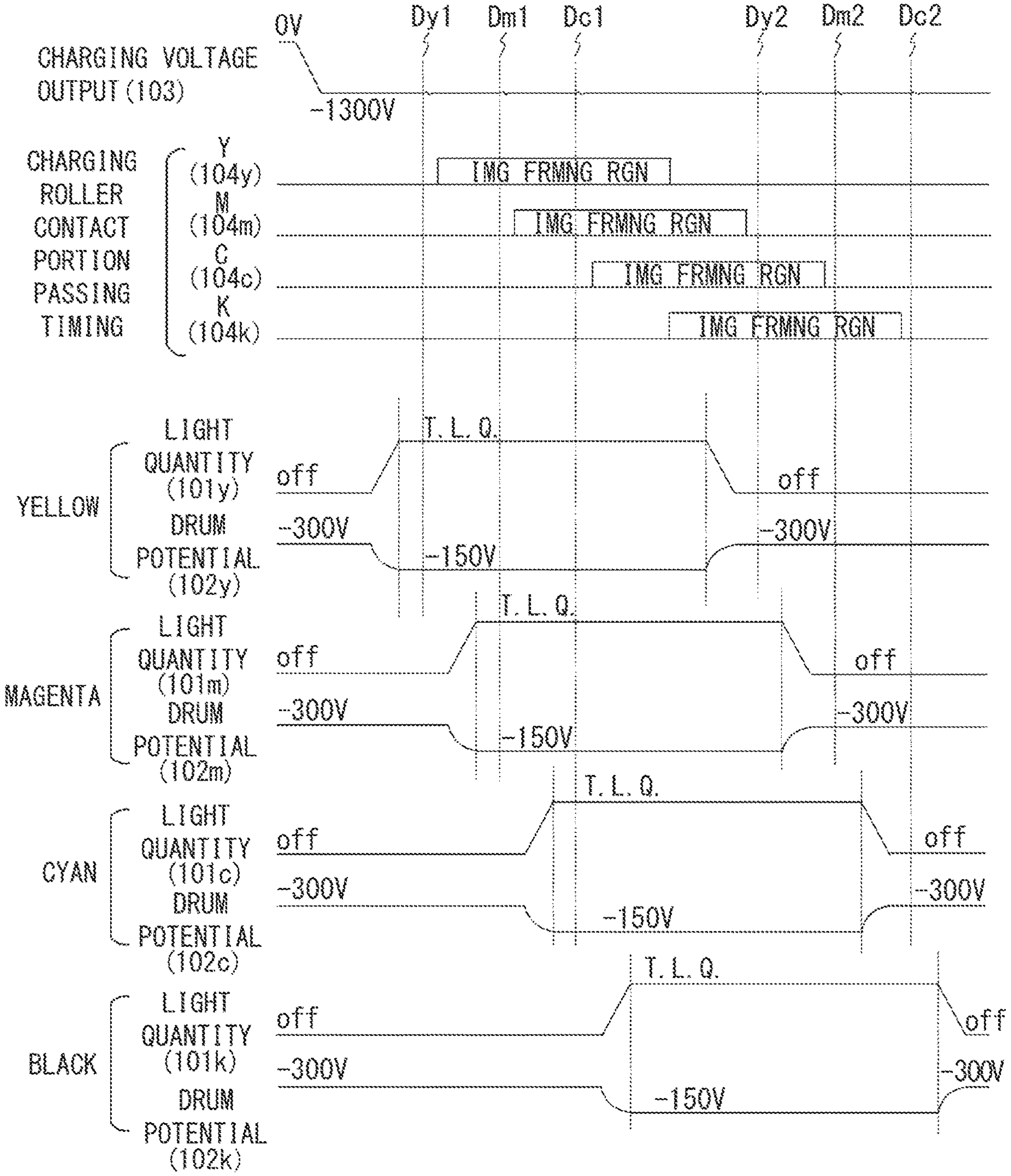

FIG. 7 is a timing chart showing states of pre-charging exposure devices and photosensitive drums during a printing operation in the embodiment 1.

Figure 8:
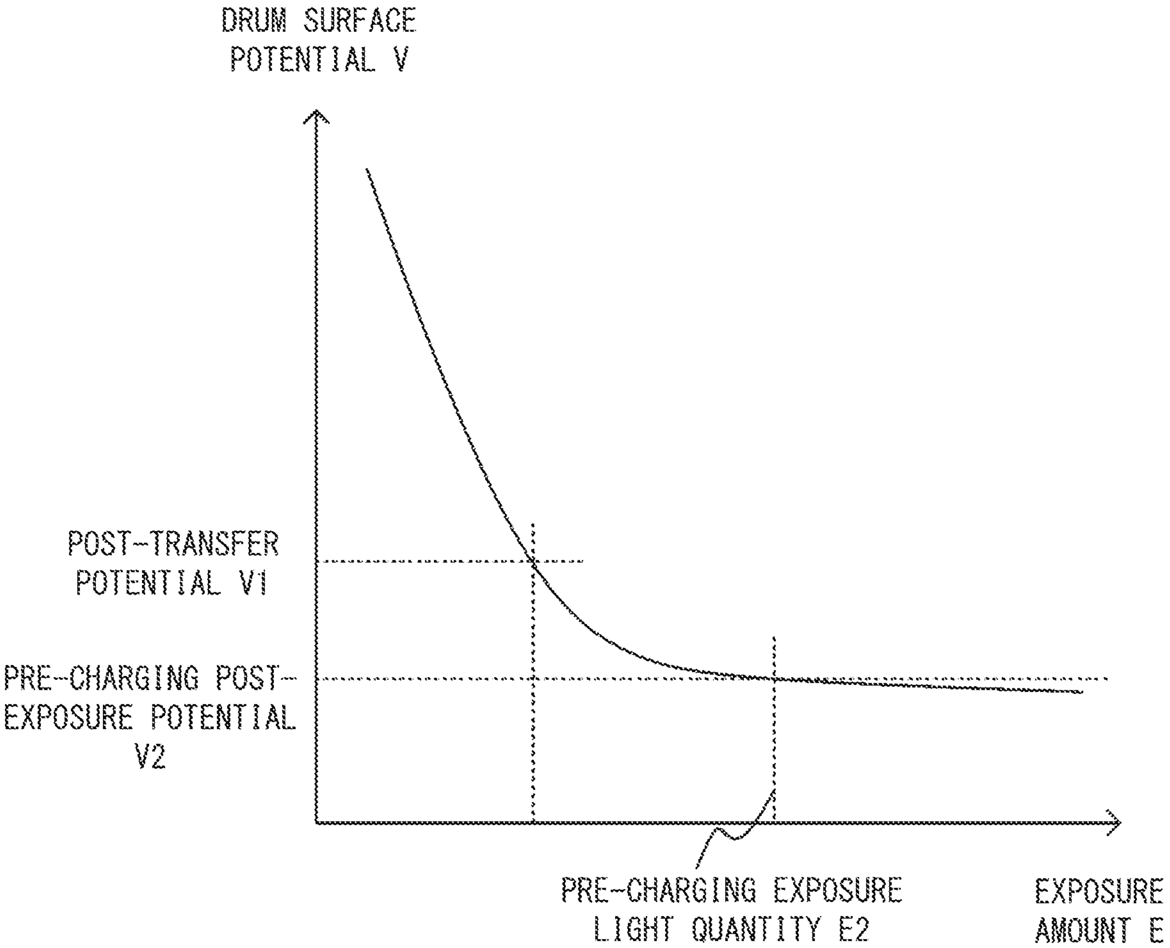

FIG. 8 is a graph for illustrating a photosensitive characteristic of the photosensitive drum in the embodiment 2.

Figure 9:
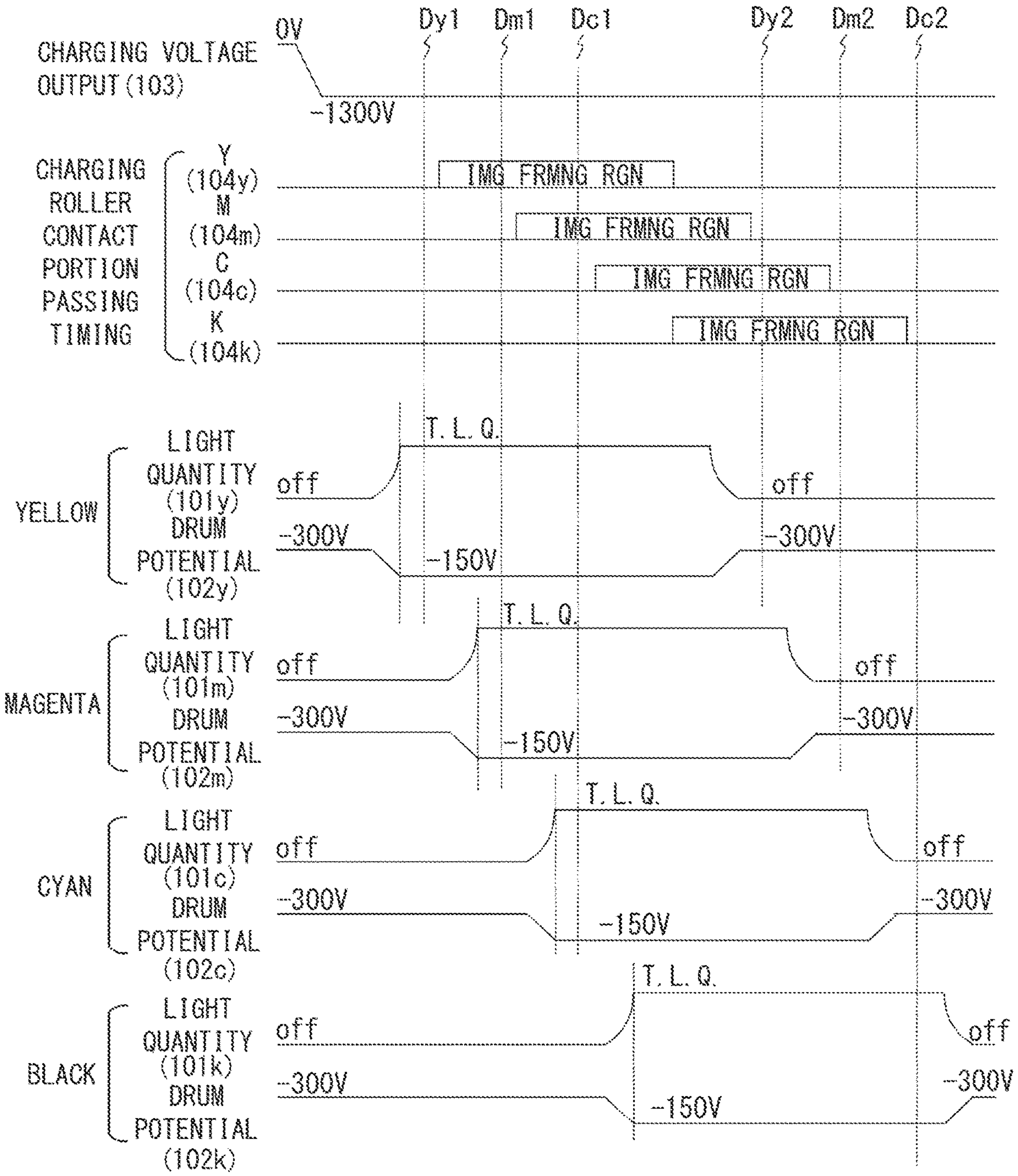

FIG. 9 is a timing chart showing states of pre-charging exposure devices and photosensitive drums during a printing operation in the embodiment 2.

Figure 10:
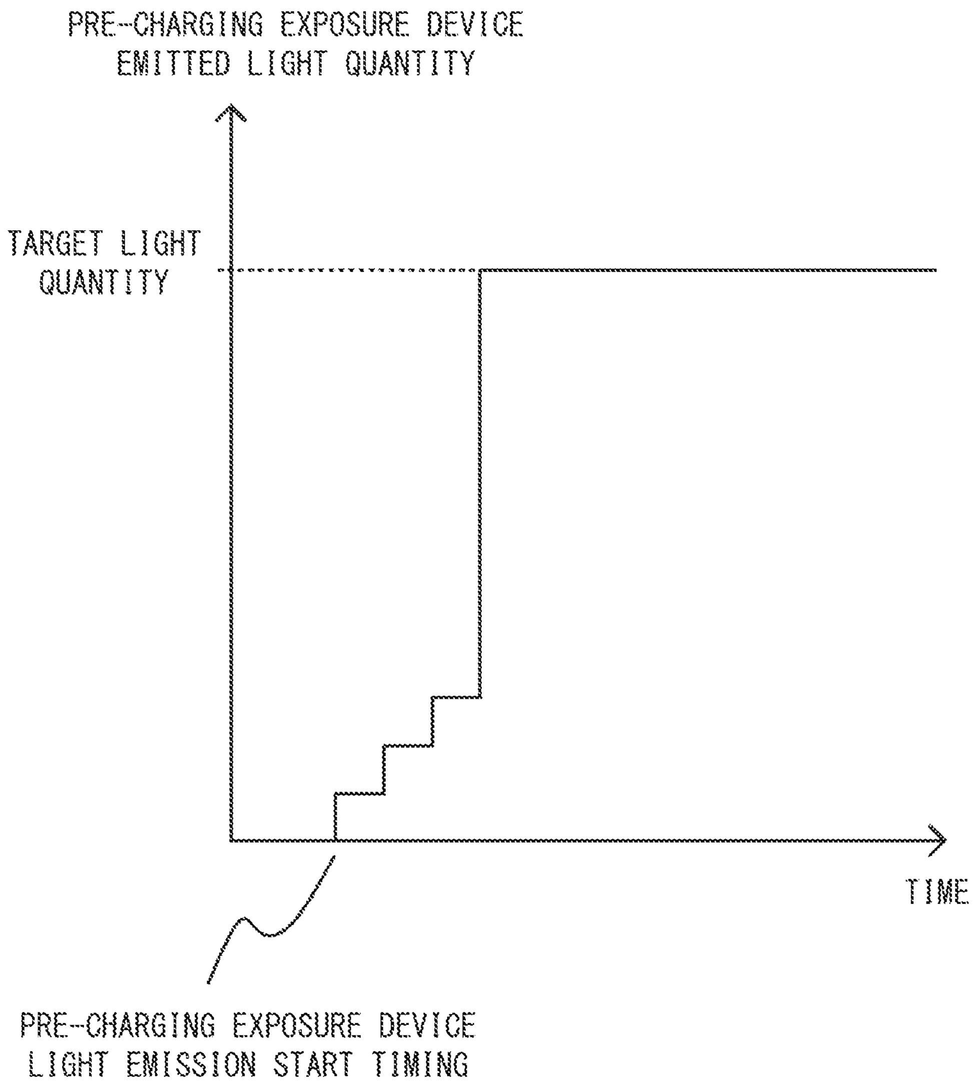

FIG. 10 is a graph for illustrating a light emission control method of the pre-charging exposure device in the embodiment 2.

Figure 11:
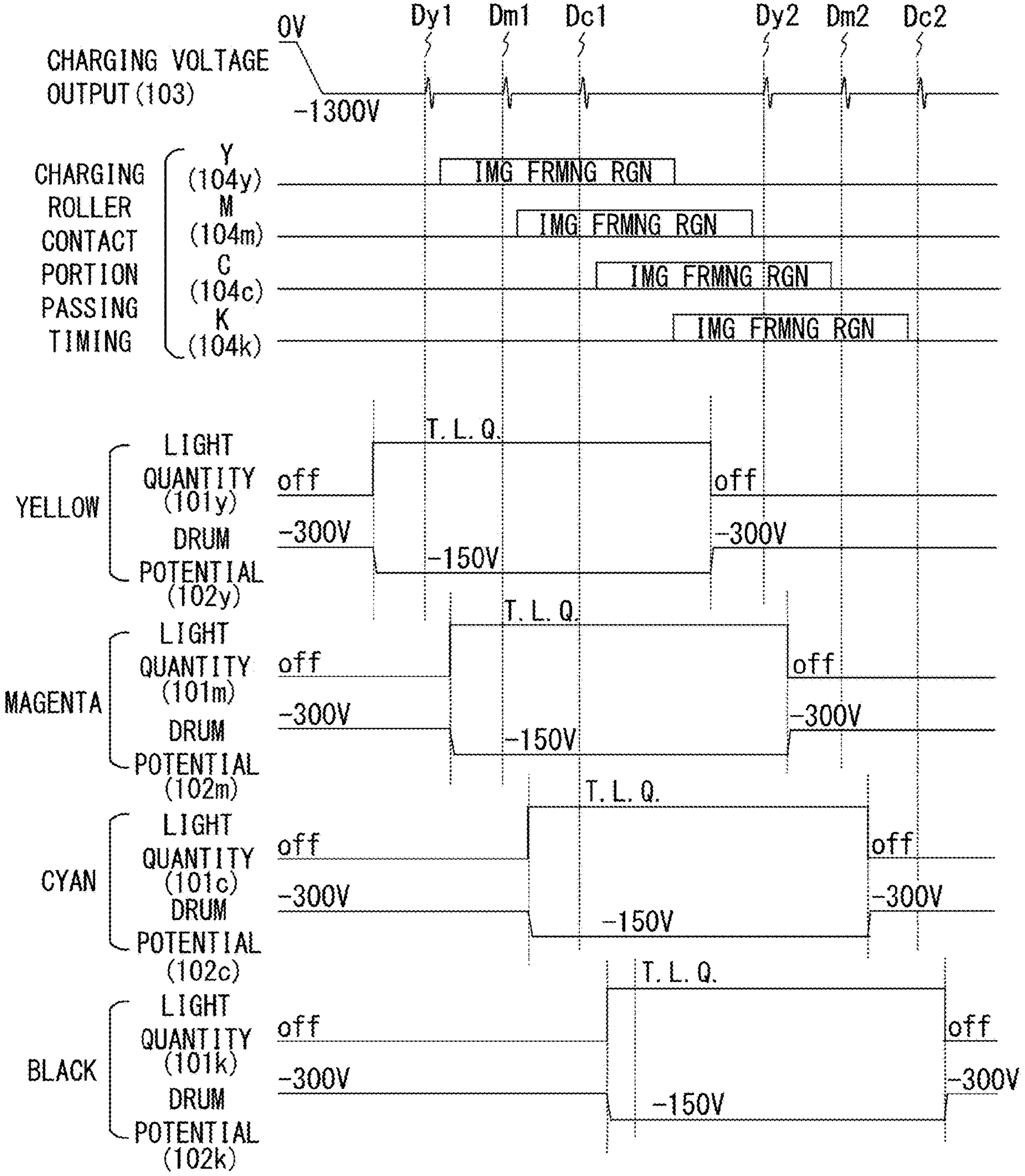
Fig. 11 Prior Art

FIG. 11 is a timing chart showing states of pre-charging exposure devices and photosensitive drums during a printing operation in a conventional example.

DESCRIPTION OF THE EMBODIMENTS

In the following, embodiments of the present invention will be specifically described with reference to the drawings.

[Image Forming Apparatus]

Figure 1:
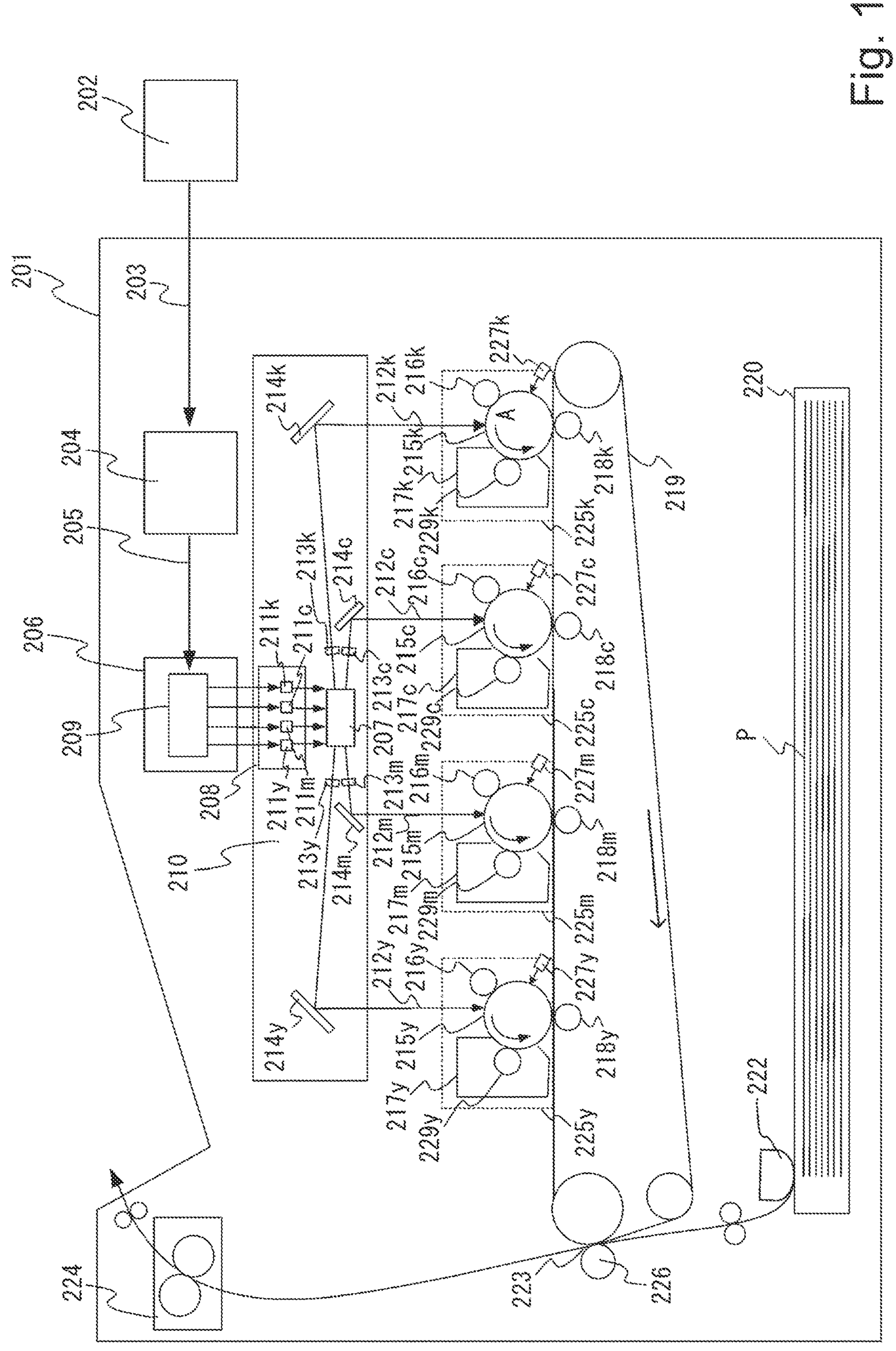
FIG. 1 is a sectional view showing a schematic constitution of an image forming apparatus according to embodiments 1 and 2.

FIG. 1 is a sectional view showing a schematic constitution of a color laser beam printer 201 which is an image forming apparatus to which the present invention is applied. The color laser beam printer 201 shown in FIG. 1 includes process cartridges 225*y*, 225*m*, 225*c*, and 225*k* which are image forming portions for forming images of yellow (Y), magenta (M), cyan (C) and black (K), respectively, as toner colors. Incidentally, constitutions and operations of the process cartridges are substantially the same. Further, y, in, c and k added to ends of reference numerals of members except for the process cartridges 225 show members corresponding to the process cartridges for yellow (Y), magenta (M), cyan (C) and black (K), respectively, as the toner colors. In the following, except for the case where the members for a specific process cartridge 225 are described, y, m, c and k added to the ends of the reference numerals of the members will be omitted from description.

In the color laser beam printer 201 (hereinafter, referred to as the printer 201), each process cartridge 225 includes a photosensitive drum 215 which is an image bearing member. The photosensitive drum 215 is rotationally driven in an arrow direction (counterclockwise direction) in FIG. 1 by a driving source (not shown). At a periphery of the photosensitive drum 215, a charging roller 216, a developing device 217, and a pre-charging exposure device 227 (described specifically later) are provided. The charging roller 216 which is a charging member electrically charges a surface of the photosensitive drum 215 to a uniform potential. Further, by laser light emitted from an optical device 210 which is an exposure portion (described later), an electrostatic latent image is formed on the photosensitive drum 215.

The developing device 217 which is a developing portion develops the electrostatic latent image formed on the photosensitive drum 215 by depositing a developer (toner) on the electrostatic latent image by a developing roller 229, so that a toner image is formed. Thus, the process cartridge 225 is constituted by integrally assembling the photosensitive drum 215, the charging roller 216, the developing device 217, and the pre-charging exposure device 227 into a unit.

In the printer 201, when a video controller 204 receives image data 203 including a print instruction and image information from a host computer 202, which is an external computer, the video controller 204 develops the image data and forms image data for forming an image. Then, the video controller 204 generates, on the basis of the formed image data, a video signal 205 which is data of a video signal form for subjecting a laser diode 211 of the optical device 210 to light emission control, and outputs the video signal 205 to an engine controller 206.

The engine controller 206 includes a CPU 209 and controls an image forming operation of the printer 201. When the CPU 209 which is a controller (control means) drive-controls the laser diode 211 disposed on a laser control substrate 208 in the optical device 210, so that light is emitted in synchronism with the video signal 205. A laser beam 212 emitted from the laser diode 211 corresponding to each process cartridge 225 is deflected by a rotatable polygonal mirror 207 and passes through a lens 213, and is reflected by a fold-back mirror 214. The laser beam 212 reflected by the fold-back mirror 214 is emitted to the photosensitive drum 215 in the corresponding process cartridge.

The photosensitive drum 215 in the process cartridge 225 is electrically charged to a desired charge amount (potential) by the charging roller 216. The photosensitive drum 215 is irradiated with the laser beam 212 emitted from the laser diode 211, so that the surface potential of the photosensitive drum 215 is partially lowered, so that the electrostatic latent image is formed on the surface of the photosensitive drum 215. Then, in order to visualize the electrostatic latent image formed by the laser beam 212 irradiation, the developing device 217 deposits the developer (toner) on the electrostatic latent image, so that a toner image depending on the electrostatic latent image is formed on the photosensitive drum 215.

The toner image formed on the photosensitive drum 215 is transferred from the photosensitive drum 215 of each process cartridge 225 onto the intermediary transfer belt 219, which is a toner image receiving member, by applying a primary transfer voltage to a primary transfer roller 218, which is a transfer portion. An intermediary transfer belt 219 is rotationally moved in an arrow direction (clockwise direction) in FIG. 1. First, the toner image on the photosensitive drum 215*y* of the process cartridge 225*y* for yellow of the toner colors is transferred onto the intermediary transfer belt 219. Thereafter, the toner images formed on the photosensitive drums 215*m*, 215*c*, and 215*k* of the process cartridges 225*m*, 225*c*, and 225*k* for magenta, cyan, and black of the toner colors are successively transferred onto the intermediary transfer belt 219, so that a color image is formed. As viewed in a rotation movement direction of the intermediary transfer belt 219, the process cartridges 225*y*, 225*m*, and 225*c*, which are each a first image forming portion, are provided on the side upstream of the process cartridge 225*k*, which is a second image forming portion.

Further, as shown in FIG. 1, the printer 201 includes a cassette 220 in which a recording material P which is recording medium is accommodated. In synchronism with the image forming operation by the above-described process cartridge 225, the recording material P accommodated in the cassette 220 is fed to a feeding passage by a paper feeding roller 222, and a conveying roller provided along the feeding passage conveys the recording material P to a secondary transfer roller 226.

The secondary transfer roller 226 press-contacts the intermediary transfer belt 219 toward an opposite roller, and forms a secondary transfer portion 223 where the intermediary transfer belt 219 and the secondary transfer roller 226 are in contact with each other.

To the secondary transfer roller 226, a secondary transfer voltage is applied, so that the toner image formed on the intermediary transfer belt 219 is transferred onto the recording material P in a secondary transfer portion 223. Incidentally, to the charging roller 216, the developing roller 229, the primary transfer roller 218, and the secondary transfer roller 226 which are described above, a desired charging voltage, a desired developing voltage, a desired primary transfer voltage, and a desired secondary transfer voltage are applied. The CPU 209 carries out control so that the voltages depending on a characteristic of the recording material P are supplied from a high-voltage power source supplying the respective applied voltages. Thereafter, the recording material P on which the toner image is transferred is heated and pressed in a fixing device 224, so that the toner image is fixed on the recording material P, and then the recording material on which the toner image is fixed is discharged onto a discharge portion outside the printer 201.

Further, each process cartridge 225 includes the pre-charging exposure device 227 which is a discharging portion for smoothing the surface potential of the photosensitive drum 215 by discharging the photosensitive drum surface after the primary transfer through irradiation of the photosensitive drum surface with the light emitted from the light emitting element is provided. As shown in FIG. 1, the pre-charging exposure device 227 is disposed on a side downstream of the primary transfer roller 218 and upstream of the charging roller 216 with respect to a rotational direction of the photosensitive drum 215. That is, the pre-charging exposure device 227 has a constitution in which the pre-charging exposure device 227 exposes the surface of the photosensitive drum 215 on a side downstream of the transfer portion which is a contact portion between the photosensitive drum 215 and the intermediary transfer belt 219 and upstream of the charging portion which is a contact portion between the photosensitive drum 215 and the charging roller 216.

[Pre-Charging Exposure Device]

Next, the constitution of the pre-charging exposure device 227 will be described. In order to simplify description, only the constitution of the pre-charging exposure device 227*y* of the process cartridge 225*y* for yellow of the toner colors will be described. Incidentally, also, as regards the pre-charging exposure devices 227*m*, 227*c*, and 227*k* provided in other process cartridges 225*m*, 225*c*, and 225*k*, the constitutions thereof are similar to the constitution of the process cartridge 225*y*.

Figure 2:
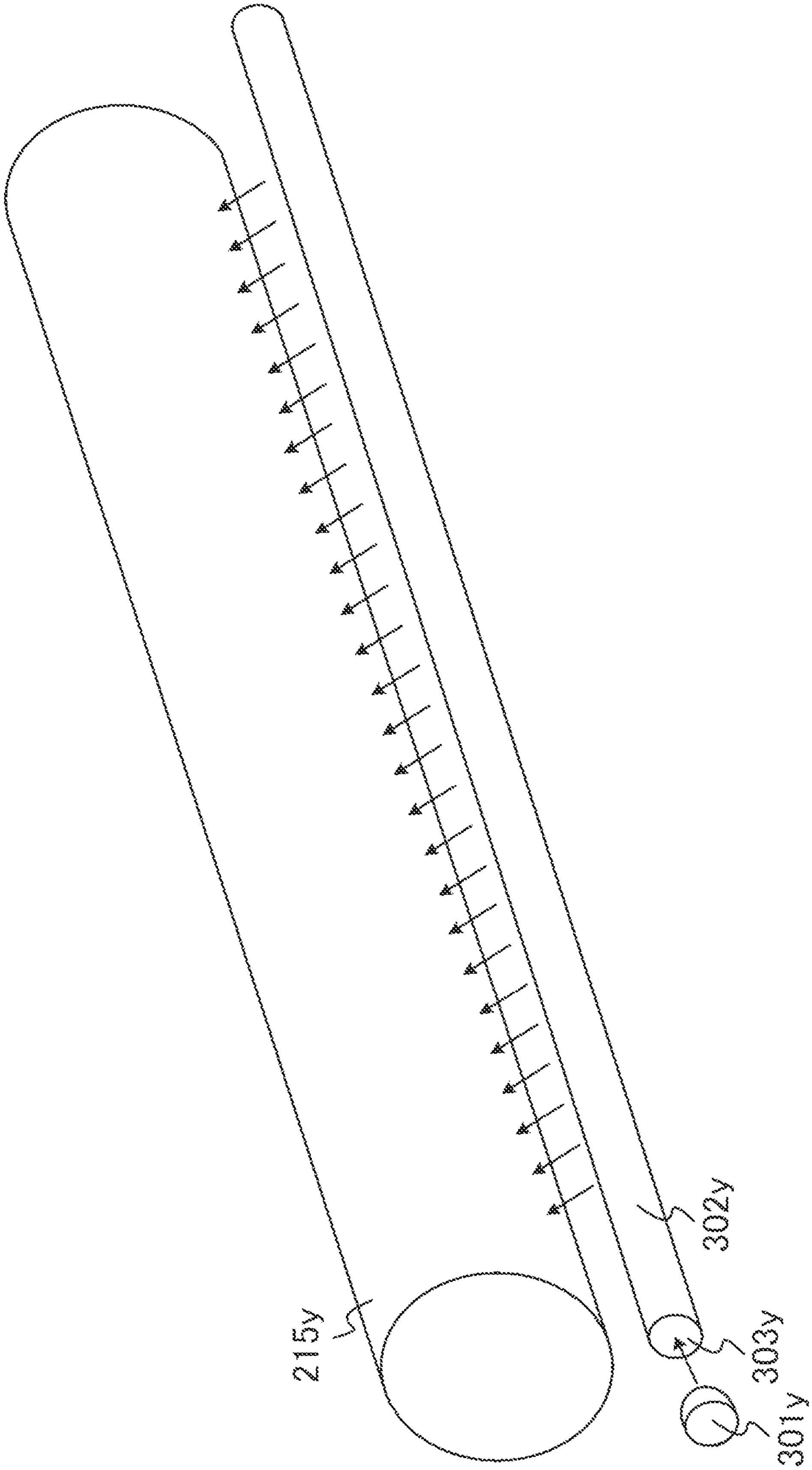
FIG. 2 is a perspective view showing a schematic constitution of a pre-charging exposure device in the embodiments 1 and 2.

FIG. 2 is a perspective view for illustrating the constitution of the pre-charging exposure device 227*y* for performing the pre-charging exposure of the photosensitive drum 215*y*. As shown in FIG. 2, the pre-charging exposure device 227*y* is constituted by a light emitting element (device) 301*y* and a light guide 302*y*. The light emitting element 301*y* is a light emitting element used for the pre-charging exposure and is provided on a main assembly side of the printer 201. On the other hand, the light guide 302*y* is a light guiding member for irradiating the photosensitive drum 215*y* with light emitted from the light emitting element 301*y*, and is provided in a cartridge tray (not shown) for holding the process cartridge 225*y*. The light guide 302*y* is disposed on a side downstream of the primary transfer roller 218*y* shown in FIG. 1 and upstream of the charging roller 216*y* with respect to the rotational direction (counterclockwise direction) of the photosensitive drum 215.

As shown in FIG. 2, the light guide 302*y* is disposed substantially parallel to an axial direction (rotational axis direction) of the photosensitive drum 215*y*, and at one end of the light guide 302*y* with respect to a longitudinal direction, a light incident portion 303*y* for receiving the light emitted from the light emitting element 301*y* is provided. The light emitting element 301*y* is subjected to control of an emitted light quantity at a predetermined timing by an emitted light quantity controller (not shown). Light emitted from the light emitting element 301*y* and incident on the light guide 302*y* is diffused in diffused light from a side surface of the light guide 302*y*, and the photosensitive drum 215*y* is irradiated with the diffused light, so that the surface potential of the photosensitive drum 215*y* is removed.

In this embodiment, the emitted light quantity of the pre-charging exposure device 227 is adjusted so as to become a light quantity set in advance, but for example, a mechanism for adjusting the emitted light quantity may be provided. That is, in the neighborhood of the light emitting element 301, the light guide 302, and the photosensitive drum 1, a light receiving element (device) for detecting the emitted light quantity of the pre-charging exposure device 227 is provided. Further, a mechanism for adjusting the emitted light quantity depending on deterioration of the light emitting element 301, contamination of the light guide 302, and a change in received light sensitivity of the photosensitive drum 215 on the basis of the emitted light quantity detected by the light receiving element may be provided. Further, in this embodiment (embodiment 1), a constitution in which the light guide 302*y* is provided in the cartridge tray (not shown) was described, but for example, the following constitution may be employed. That is, a constitution in which the light guide 302*y* is provided in the process cartridge 225*y*, a constitution in which an LED array is used instead of the light guide 302*y*, and a constitution in which the light guide 302*y* is eliminated for simplifying the apparatus and in which the photosensitive drum 215 is directly irradiated with the light may be employed.

[Control Circuit of Pre-Charging Exposure Device]

Next, a circuit for controlling the emitted light quantity of the light emitting element 301 of the pre-charging exposure device 227 will be described. In this embodiment, for simplifying the description, only the circuit for controlling the emitted light quantity of the light emitting element 301*y* of the pre-charging exposure device 227*y* of the process cartridge 225*y* for yellow of the toner colors will be described. Incidentally, also, as regards the circuits for controlling the emitted light quantities of the light emitting elements 301*m*, 301*c*, and 301*k* of other process cartridges 225*m*, 225*c*, and 225*k*, constitutions thereof are similar to the constitution of the process cartridge 225*y*.

Figure 3:
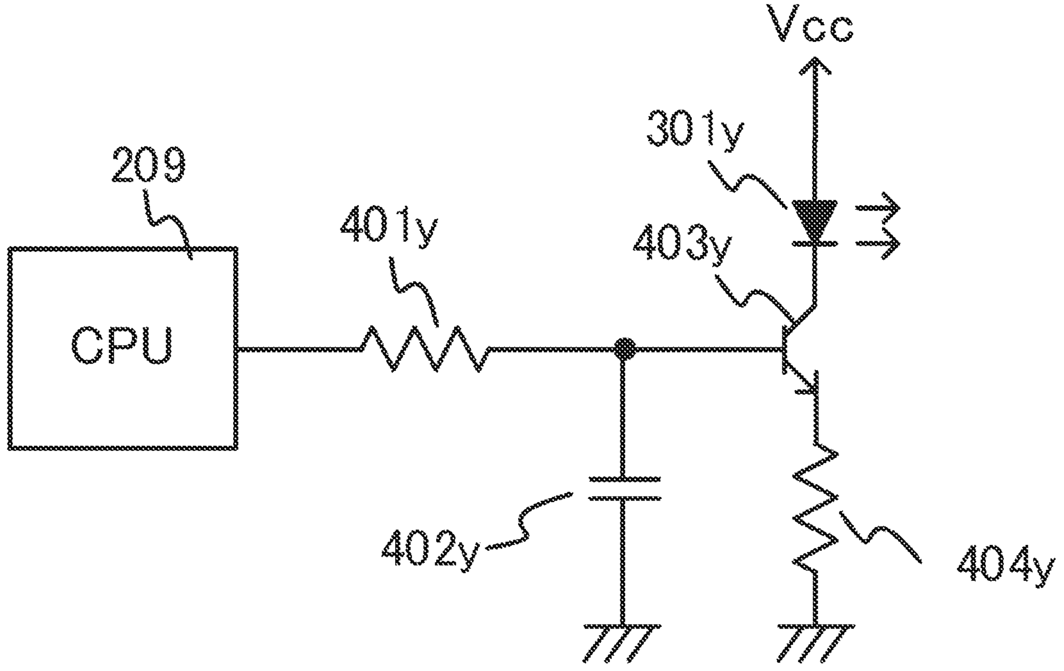
FIG. 3 is a circuit diagram showing a circuit constitution of a light emission control circuit of the pre-charging exposure device in the embodiments 1 and 2.

FIG. 3 is a circuit diagram showing a circuit constitution of a light emission control circuit of the light emitting element 301*y* of the pre-charging exposure device 227*y*. The light emission control circuit includes the light emitting element 301*y*, which is a light emitting diode (hereinafter, also referred to as a light emitting diode 301*y*), resistors 401*y* and 404*y*, a capacitor 402*y*, and a transistor 403*y*. To the light emission control circuit, a PWM signal for controlling the emitted light quantity of the light emitting element 301*y* is outputted from the CPU 209 (FIG. 1) of the engine controller 206. The PWM signal is smoothed by an RC filter constituted by the resistor 401*y* and the apacitor 402*y* and is inputted to a base terminal of the ctransistor 403*y*. A constitution in which a voltage inputted to the base terminal of the transistor 403*y* is capable of being adjusted depending on an OnDuty (duty) of the PWM signal.

To a collector terminal of the transistor 403, a cathode terminal of the light emitting diode 301*y* is connected, and an anode terminal of the light emitting diode 301*y* is connected to a power source voltage Vcc.

On the other hand, an emitter terminal of the transistor 403*y* is connected to the ground via the resistor 404*y*. On the basis of a base terminal voltage of the transistor 403*y*, a voltage dropped by a voltage between the base and the emitter is applied to the resistor 404*y*. By this, a current flowing through the light emitting element 301*y* is controlled, so that the light quantity of the light with which the photosensitive drum 215*y* is irradiated is changed depending on a current value of the current flowing through the light emitting element 301*y*.

Parts (a) to (c) of FIG. 4 are graphs showing a base voltage characteristic of the transistor 403*y* relative to an OnDuty (on state ratio in one cyclic period) of the PWM signal outputted from the CPU 209, a relationship between the OnDuty of the PWM signal and a control current ratio flowing through the light emitting element 301*y*, and a relationship between the OnDuty of the PWM signal and the emitted light quantity of the light emitting element 301*y*, respectively. Part (a) of FIG. 4 is the graph showing a relationship between the OnDuty of the PWM signal and the base voltage inputted to the transistor 403*y*. In part (a) of FIG. 4, the abscissa represents the OnDuty (unit: %), and the ordinate represents the base voltage (unit: V) of the transistor 403*y*. As shown in part (a) of FIG. 4, when the OnDuty of the PWM signal is 20%, the voltage of the base terminal of the transistor 403*y* is 0.7 V and thus is a voltage at which the transistor 403*y* is turned on. Further, when the OnDuty of the PWM signal is 100%, the voltage of the base terminal of the transistor 403*y* is 3.3 V.

Part (b) of FIG. 4 is the graph showing a relationship between the OnDuty of the PWM signal and the control current ratio of the current flowing through the light emitting element 301*y*. In part (b) of FIG. 4, the abscissa represents the OnDuty (unit: %) of the PWM signal, and the ordinate represents the control current ratio (unit: %) of the current flowing through the light emitting element 301*y*. The control current ratio shows a ratio of the current flowing through the light emitting element 301*y* when the current flowing through the light emitting element 301*y* when the OnDuty of the PWM signal is 100% is taken as 100%. Part (b) of FIG. 4 shows that the transistor 403*y* is in an ON state from the neighborhood of the OnDuty of the PWM signal exceeding about 20% and thus the current starts to flow through the light emitting element 301*y* and that the light emission control of the light emitting element 301*y* of the pre-charging exposure device 227*y* is capable of being carried out from a small light quantity region.

Further, part (c) of FIG. 4 is the graph showing a relationship between the OnDuty of the PWM signal and the emitted light quantity ratio of the light emitting element 301*y*. In part (c) of FIG. 4, the abscissa represents the OnDuty (unit: %) of the PWM signal, and the ordinate represents the emitted light quantity ratio (unit: %) of the light emitting element 301*y*. The emitted light quantity ratio shows a ratio of the emitted light quantity of the light emitting element 301*y* in a case that the emitted light quantity when the OnDuty of the PWM signal is 100% is 100%. Thus, the CPU 209 variably changes the OnDuty of the PWM signal to be outputted and controls the emitted light quantity of the light emitting element 301*y* used in the pre-charging exposure, so that a discharge amount of the photosensitive drum 215*y* when the pre-charging exposure is performed can be adjusted.

In this embodiment, a method in which via the RC filter constituted by the resistor 401*y* and the capacitor 402*y*, the base voltage of the transistor 403*y* is controlled and the current flowing through the light emitting element 301*y* is controlled, and thus the emitted light quantity of the light emitted by the light emitting element 301*y* is adjusted was described. In this embodiment, the emitted light quantity was adjusted by controlling the current flowing through the light emitting element 301*y*, but for example, a method in which the discharge amount of the surface electric charge of the photosensitive drum 215*y* is adjusted by causing the light emitting element 301*y* to emit light pulses may be employed.

[High-Voltage Power Source]

Next, a constitution of the high-voltage power source of the printer 201 of this embodiment will be described. FIG. 5 is a schematic sectional view for illustrating the constitution of the high-voltage power source for supplying a high voltage to the process cartridges 225*y*, 225*m*, 225*c*, and 225*k*, and the like for forming the images. In FIG. 5, how to supply voltages from which high-voltage power source to the charging roller 216, the developing roller 229, the primary transfer roller 218, and the secondary transfer roller 226 of each process cartridge is schematically shown.

In FIG. 5, a voltage generating circuit 601 which is a power source portion generates a charging voltage Vc1 and supplies the charging voltage Vc1 to the charging rollers 216*y*. 216*m*, and 216*c* of the process cartridges 225*y*, 225*m*, and 225*c* for yellow (Y), magenta (M) and cyan (C) of the toner colors. In this embodiment, in order to downsize the power source downstream, to the charging rollers 216*y*, 216*m*, and 216*c* which are charging members of the plurality of process cartridges 225, the charging voltage Vc1 is supplied from a common voltage generating circuit 601 (first power source). When power (power source) is supplied from the voltage generating circuit 601 to the charging rollers 216*y*, 216*m*, and 216*c*, a constitution in which different voltages are supplied to the charging rollers 216*y*, 216*m*, and 216*c* by connecting a resistor, Zener diode, and the like to between the respective charging rollers may be employed. That is, for example, in the case where the charging voltage is intended to be applied to the charging roller 216*y*, a constitution in which the charging voltage is applied to at least the charging roller 216*m* may only be required to be employed. At that time, such a constitution is also applicable to the charging rollers 216*c* and 216*k*, not the charging roller 216*m*.

Further, a voltage dividing circuit constituted by the resistor 603 and the Zener diode 604 generates a developing voltage Vd1 by dividing the charging voltage Vc1. In the voltage dividing circuit, one end of the resistor 603 is connected to a terminal of the voltage generating circuit for outputting the charging voltage Vc1 of the voltage generating circuit 601. Further, anode terminal of the resistor 603 is connected to an anode terminal of the Zener diode 604 and the developing rollers 229*y*, 229*m*, and 229*c* of the process cartridges 225*y*, 225*m*, and 225*c*. A cathode terminal of the Zener diode 604 is connected to the ground.

The developing voltage Vd1 generated by the voltage dividing circuit is supplied to the developing rollers 229*y*, 229*m*, and 229*c* of the process cartridges 225*y*, 225*m*, and 225*c*.

On the other hand, a voltage generating circuit 602 (second power source) generates a charging voltage Vc2 and supplies the charging voltage Vc2 to the charging roller 216*k* of the process cartridge 225*k* for black (k) of the toner colors. In this embodiment, the charging voltage is independently supplied during printing of a monochromatic image, and therefore, the voltage generating circuit 602 is provided separately from the above-described voltage generating circuit 601. Further, also, in the voltage generating circuit 602, similarly as in the voltage generating circuit 601, a voltage dividing circuit for generating a developing voltage Vd2 by dividing the charging voltage Vc2 is provided. The voltage dividing circuit is constituted by a resistor 605 and Zener diode 606. One end of the resistor 605 is connected to a terminal of the voltage generating circuit 602 for outputting the charging voltage Vc2, and the other end of the resistor 605 is connected to an anode terminal of the Zener diode 606 and the developing roller 229*k* of the process cartridge 225*k*. A cathode terminal of the Zener diode 606 is connected to the ground. The developing voltage Vd2 generated by the voltage dividing circuit is supplied to the developing roller 229*k* of the process cartridge 229*k*.

Each of the voltage generating circuits 601 and 602 includes a voltage detecting circuit (not shown) capable of variably changing the charging voltage, supplied to the associated charging roller(s) 216 depending on a use (operation) environment of the printer 201 or with a change with time of the photosensitive drum 215. In this embodiment, the charging voltage Vcl generated by the voltage generating circuit 601 is applied to the charging rollers 216*y*, 216*m*, and 216*c*, and is used for forming a background potential on the surface of the photosensitive drums 215*y*, 215*m*, and 215*c*.

On the other hand, the charging voltage Vc2 generated by the voltage generating circuit 602 is applied to the charging roller 216*k*, and is used for forming a background potential on the surface of the photosensitive drum 215*k*.

Incidentally, the charging voltage Vc1 generated by the voltage generating circuit 601 and the charging voltage Vc2 generated by the voltage generating circuit 602 have the same output value. On the other hand, the developing voltage Vd1 is applied to the developing rollers 229*y*, 229*m*, and 229*c*, and the developing voltage Vd2 is applied to the developing roller 229*k*, and these voltages are used for depositing the toners on the electrostatic latent images formed on the photosensitive drums 215.

A voltage generating circuit 607 generates a primary transfer voltage and applies the primary transfer voltage to the primary transfer rollers 218*y*, 218*m*, and 218*c*, and 218*k*, and the primary transfer voltage is used for transferring the toner images from the photosensitive drums 215 onto the intermediary transfer belt 219. Further, a voltage generating circuit 608 generates a secondary transfer voltage and applies the secondary transfer voltage to the secondary transfer roller 226, and the secondary transfer voltage is used for transferring the toner images from the intermediary transfer belt 219 onto the recording material P.

[Effect of Pre-Charging Exposure in Cleaner-Less Constitution]

Next, using FIG. 6, the cleaner-less system will be described. In this embodiment, in order to simplify the description, the pre-charging exposure in the cleaner-less constitution of the process cartridge 225*y* for yellow of the toner colors will be described. Incidentally, also as regards the pre-charging exposure in the cleaner-less constitutions of other process cartridges 225*m*, 225*c*, and 225*k*, the pre-charging exposure is similar to the pre-charging exposure of the process cartridge 225*y*.

FIG. 6 is a sectional view showing a structure of the photosensitive drum 215*y* and a periphery thereof in the process cartridge 225*y*. In FIG. 6, L shows a laser irradiation position of the laser beam 212*y* emitted from the optical device 210 to the photosensitive drum 215*y*. Further, D shows a contact portion (contact position) between the photosensitive drum 215*y* and the developing roller 229*y*. Arrows in the developing roller 229*y* and the charging roller 216*y* show rotational directions of the developing roller 229*y* and the charging roller 216*y*.

Similarly, an arrow indicated by R1 shows a rotational direction of the photosensitive drum 215*y*. Further, in FIG. 6, a black circle (dot) shows toner of the negative polarity, and a white circle shows toner of the positive polarity. Incidentally, in this embodiment, the negative polarity is a normal polarity.

In the process cartridge 225*y*, in the transfer step, the toner image formed on the photosensitive drum 215*y* is transferred onto the intermediary transfer belt 219 by the primary transfer roller 218*y*. Transfer residual toner 701*y* remaining on the surface of the photosensitive drum 215*y* without being transferred onto the intermediary transfer belt 219 is moved in the R1 direction by rotation of the photosensitive drum 215*y* in the R1 direction and is influenced by electric discharge in a gap 702*y* on aside upstream of the charging roller 216*y* with respect to the rotational direction of the photosensitive drum 215*y*. The transfer residual toner 701*y* is charged to the negative polarity similarly as the surface of the photosensitive drum 215*y* by the influence of the electric discharge in the gap 702*y*. In the contact portion of the photosensitive drum 215*y* with the charging roller 216*y*, a potential difference therebetween is such that the surface potential of the photosensitive drum 215*y* is about −700 V and the potential of the charging roller 216*y* is about −1300 V. For that reason, based on a relationship of the potential difference, the transfer residual toner 703*y* on the photosensitive drum 215*y* which is negatively charged is not deposited on the surface of the charging roller 216*y*. As a result, the transfer residual toner 703*y* which is not deposited on the charging roller 216*y* passes through the charging roller 216*y*.

The negatively charged transfer residual toner 703*y* which passes through the charging roller 216*y* while being carried on the photosensitive drum 215*y* is moved in the R1 direction and reaches the light irradiation position L where the photosensitive drum 215*y* is irradiated with the laser beam 212*y*. The transfer residual toner 703*y* is not large in amount such that the transfer residual toner 703*y* shields the laser beam 212*y*, and therefore, does not have the influence on a step of forming the electrostatic latent image on the surface of the photosensitive drum 215*y*.

Of the transfer residual toner 703*y* on the photosensitive drum 215*y*, the transfer residual toner 703*y* in a non-exposure portion where the transfer residual toner 703*y* is not irradiated with the laser beam 212*y* in the laser irradiation position L is collected on the developing roller 229*y* in the developing portion D by an electrostatic force. On the other hand, the transfer residual toner 703*y* irradiated with the laser beam 212*y* in the laser irradiation position L continuously exists on the surface of the photosensitive drum 215*y* as it is without being collected on the developing roller 229*y* by the electrostatic force.

Thus, the transfer residual toner 701*y* remaining on the surface of the photosensitive drum 215*y* without being transferred onto the intermediary transfer belt 219 is roughly collected by the developing roller 229*y*. Then, the transfer residual toner 701*y* collected by the developing roller 229*y* is mixed with the toner on the developing roller 229*y* and then is used again.

In the cleaner-less system in this embodiment, a mechanism such as a cleaning blade for removing the transfer residual toner remaining on the surface of the photosensitive drum 215*y* without being transferred onto the intermediary transfer belt 219 in the transfer step at the primary transfer portion is not provided. For that reason, there is a need to suppress that the transfer residual toner 701*y* remaining on the surface of the photosensitive drum 215*y* after the transfer step is deposited on the charging roller 216*y*. In order to further charge the transfer residual toner 701*y* to the negative polarity, the photosensitive drum 215*y* is discharged by the pre-charging exposure device 227*y*, so that the potential difference between the photosensitive drum 215*y* and the charging roller 216*y* is made large. By this, stronger electric charge is generated by the gap 702*y* formed in the neighborhood of the charging roller contact portion. Then, by this storing electric charge, the transfer residual toner 701*y* is charged to the negative polarity further uniformly. Incidentally, the potential of the exposed portion of the photosensitive drum 215*y* after the discharge by the pre-charging exposure may desirably be about −150 V substantially equal to the exposed portion potential by the laser beam 212*y*.

[Effect of Pre-Charging Exposure Against Ghost]

Next, an effect of the pre-charging exposure against the drum ghost will be described. As regards the photosensitive drum 215*y* after the exposure step by the optical device 210, the developing step by the developing roller 229, and the transfer step by the primary transfer roller 218, the surface potential becomes non-uniform depending on an image pattern formed on the photosensitive drum 215*y*. In the case where in such a state of the surface potential of the photosensitive drum 215*y*, the charging step by the charging roller 216*y* is performed in a subsequent drum (cyclic) period, depending on the image pattern formed in the last period, the surface of the photosensitive drum 215*y* cannot be charged to a uniform potential in some instances. For that reason, in the exposure step by the optical device 210 in a subsequent period, a desired electrostatic latent image cannot be formed on the photosensitive drum 215*y*, so that a ghost image is generated in some cases. For that reason, after the transfer step by the primary transfer roller 218 and before the charging step by the charging roller 216*y*, the surface of the photosensitive drum 215*y* is irradiated with light from the light emitting element 301*y* of the pre-charging exposure device 227*y*, so that the surface potential is decreased (discharged) to a predetermined residual potential level. By this, the surface potential of the photosensitive drum 215*y* after the transfer step by the primary transfer roller 218 is made uniform, so that an occurrence of the drum ghost can be suppressed.

[Light Emission/Light-Out Control of Pre-Charging Exposure Device]

A light emission control method of the pre-charging exposure device 227 in this embodiment will be described using FIG. 7. FIG. 7 is a timing chart showing states of the pre-charging exposure devices 227, the photosensitive drums 215, the charging voltage, and the like during the printing operation of the color laser beam printer 201 of this embodiment. In FIG. 7, the abscissa represents a time. In FIG. 7, 101*y*, 101*m*, 101*c*, and 101*k* show emitted light quantities of the light emitting elements of the pre-charging exposure devices 227 in the process cartridges 225 for yellow (Y), magenta (M), cyan (C), and black (K) of the toner colors, respectively. Further, 102*y*, 102*m*, 102*c*, and 102*k* show progressions of the surface potentials of the photosensitive drums 215 in the neighborhood of positions (pre-charging exposure portions) where the photosensitive drums 215 are irradiated with the laser beams from the light emitting elements 301 of the pre-charging exposure devices 227 in the process cartridges 225. Further, 103 shows an output waveform of a charging voltage (−1300 V) of the above-described voltage generating circuit 601. Further, 104*y*, 104*m*, 104*c*, and 104*k* show timings when image forming regions on the photosensitive drums 215 of the process cartridges 225 pass through the contact portions of the photosensitive drums 215 with the charging rollers 216.

First, the light emission control method of the pre-charging exposure device 227*y* in the process cartridge 225*y*, which is a yellow station, will be described. In FIG. 7, 101*y* and 102*y* show the emitted light quantity of the light emitting element 301*y* of the pre-charging exposure device 227*y* in the process cartridge 225*y* and the progression of the surface potential of the photosensitive drum 215*y* in the neighborhood of the position (pre-charging exposure portion) where the photosensitive drum 215*y* is irradiated with the light (laser beam) from the light emitting element 301*y*, respectively. In this embodiment, the following control is carried out when the discharge of the photosensitive drum 215*y* is performed by the light emitted from the light emitting element 301*y* of the pre-charging exposure device 227*y* after the transfer step. That is, as shown by 101*y* in FIG. 7, control of the emitted light quantity is carried out so that the emitted light quantity of the light emitting element 301*y* of the pre-charging exposure device 227*y* is stepwise increased from a lights-out state (OFF state) in 8 levels in about 300 msec. In the following, such control of the emitted light quantity is referred to as stepwise rising control of the emitted light quantity. Thus, by executing the stepwise rising control of the emitted light quantity, as shown in FIG. 7 by 102*y*, the surface potential of the photosensitive drum 215*y* in the neighborhood of the pre-charging exposure portion does not cause an abrupt potential fluctuation and is moderately displaced from −300 V to −150 V depending on a stepwise displacement amount of the emitted light quantity. Also, as regards the process cartridges 225*m*, 225*c*, and 225*k*, similarly as in the process cartridge 225*y*, the emitted light quantities of the light emitting elements 301 of the pre-charging exposure devices 227 are subjected to the stepwise rising control as shown in FIG. 7 by 101*m*, 101*c*, and 101*k*, respectively. By carrying out the stepwise rising control of the light emitting elements 301, the surface potentials of the photosensitive drums 215 of the process cartridges 225*m*, 225*c*, and 225*k* can be moderately displaced from −300 V to −150 V as shown in FIG. 7 by 102*m*, 102*c*, and 102*k*, respectively.

Next, charging voltage output supplied to the charging rollers 216 of the process cartridges 225*y*, 225*m*, 225*c*, and 225*k* will be described. In FIG. 7, 103 shows an output waveform of the charging voltage Vc1 supplied from the voltage generating circuit 601 which is the common high-voltage power source to the charging rollers 216*y*, 216*m*, and 216*c* of the process cartridges 225*y*, 225*m*, and 225*c*. The charging voltage Vc1 is supplied to the charging rollers 216*y*, 216*m*, and 216*c* from the voltage generating circuit 601 which is the common high-voltage power source. For that reason, when the surface potential of the photosensitive drum 215 abruptly fluctuates before and after the pre-charging exposure, the output of the voltage generating circuit 601 cannot follow a load fluctuation with the abrupt surface potential fluctuation of the photosensitive drum 215, so that the output of the charging voltage fluctuates. Further, in FIG. 7, Dy1 represents a timing when the pre-charging exposure portion on the photosensitive drum 215*y* irradiated with the light from the light emitting element 301*y* of the pre-charging exposure device 227*y* reaches the contact portion of the photosensitive drum 215*y* with the charging roller 216*y*. Similarly, Dm1 represents a timing when the pre-charging exposure portion on the photosensitive drum 215*m* irradiated with the light from the light emitting element 301*m* of the pre-charging exposure device 227*m* reaches the contact portion of the photosensitive drum 215*m* with the charging roller 216*m*. Further, Dc1 represents a timing when the pre-charging exposure portion on the photosensitive drum 215*c* irradiated with the light from the light emitting element 301*c* of the pre-charging exposure device 227*c* reaches the contact portion of the photosensitive drum 215*c* with the charging roller 216*c*.

In FIG. 7, as shown by 102*y*, 102*m*, 102*c*, and 102*k*, displacements of the surface potentials of the photosensitive drums 215 of the process cartridges 225*y*, 225*m*, 225*c*, and 225*k* in the positions of the pre-charging exposure portions where the above-described pre-charging exposure is started become gentle. For that reason, at the timings Dy1, Dm1, and Dc1 when the positions of the pre-charging exposure portions where the pre-charging exposure of the photosensitive drums 215*y*, 215*m*, and 215*c* is started reach the charging rollers 216, the voltage generating circuit 601 is little influenced by the load fluctuation of the pre-charging exposure. As a result, the voltage generating circuit 601 is capable of continuously supplying a stable charging voltage Vc1 to the charging rollers 216 of the process cartridges 225*y*, 225*m*, and 225*c*. Incidentally, as regards the process cartridge 225*k*, to the charging roller 216*k*, the charging voltage is supplied from the voltage generating circuit 602 other than the voltage generating circuit 601. For that reason, in the constitution of the power source device in this embodiment, there is no influence on the charging voltage Vc1 supplied from the voltage generating circuit 601 to the process cartridges 225*y*, 225*m*, and 225*c*.

In FIG. 7, 104*y*, 104*m*, 104*c*, and 104*k* represent the timings when the image forming regions of the photosensitive drums 215 of the process cartridges 225*y*, 225*m*, 225*c*, and 225*k*, respectively, pass through the contact portions of the photosensitive drums 215 with the charging rollers 216. Each image forming region of the photosensitive drum 215 is a region (section) in which the electrostatic latent image is formed by the laser beam 212 emitted from the optical device 210 described above with reference to FIG. 6. When the charging voltage Vc1 supplied from the voltage generating circuit 601 fluctuates in a section in which the image forming region of the photosensitive drum 215 contacts the charging roller 216, the background potential for forming the image on the surface of the photosensitive drum 215 is displaced. As a result, density non-uniformity of the formed image occurs.

Further, as shown in FIG. 7 by 104*y*, the timings Dm1 and Dc1 overlap with each other in a period in which the image forming region on the photosensitive drum 215*y* of the process cartridge 225*y* passes through the contact portion with the charging roller 216*y*. The timings Dm1 and Dc1 represent timings when the pre-charging exposure portions of the photosensitive drums 215*m* and 215*c* of the process cartridges 225*m* and 225*c* contact the charging rollers 216*m* and 216*c*, respectively. In this embodiment, as described above, the stepwise rising control of the light emitting elements of the pre-charging exposure devices 227*m* and 227*c* of the process cartridges 225*m* and 225*c* is carried out. By this, abrupt fluctuations in surface potential of the photosensitive drums 215*m* and 215*c* of the process cartridges 225*m* and 225*c* are suppressed, so that an output fluctuation of the charging voltage Vc1 of the voltage generating circuit 601 can be suppressed. Further, in this embodiment, timings when the stepwise rising control of the light emitting elements 301 of the pre-charging exposure devices 227*y*, 227*m*, and 227*c* of the process cartridges 225*y*, 225*m*, and 225*c* is started are deviated depending on timings of a start of image formation, respectively. For that reason, at the timings Dy1, Dm1, and Dc1, as regards the charging voltage outputs, the stable charging voltage Vc1 can be continuously supplied to the charging rollers 216 of the process cartridges 225*y*, 225*m*, and 225*c*, respectively. As a result, the background potential in each of the image forming regions of the photosensitive drums of the process cartridges 225 is not fluctuated, so that high-quality image formation with no density non-uniformity can be carried out.

As described above, the light emission control method of the pre-charging exposure device 227 was described, but also when the light emitting element 301 of the pre-charging exposure device 227 is turned off, the abrupt fluctuation of the surface potential of the photosensitive drum 215 can be suppressed by lights-out of the light emitting element 301 by lowering the light quantity stepwise from a target light quantity. That is, as shown in FIG. 7 by 101*y*, control of the emitted light quantity is carried out so that the emitted light quantity of the light emitting element 301*y* of the pre-charging exposure device 227*y* is lowered stepwise from a state of a predetermined target light quantity to the turn-off state (OFF state) (hereinafter this control is referred to as stepwise falling control). Thus, by carrying out the stepwise failing control of the emitted light quantity, as shown in FIG. 7 by 102*y*, the surface potential of the photosensitive drum 215*y* in the neighborhood of the pre-charging exposure portion is gently displaced from −150 V to −300 V depending on a stepwise displacement amount of the emitted light quantity without causing the abrupt fluctuation. As a result, the occurrence of the potential non-uniformity on the surface of the photosensitive drum 215*y* can be suppressed.

Further, in this embodiment, the timings when the stepwise falling control of the light emitting elements 301 of the pre-charging exposure devices 227*y*, 227*m*, and 227*c* in the process cartridges 225*y*, 225*m*, 225*c* is started are deviated on the basis of timings when associated image formation is ended. By this, during the lights-out (turning-off) of the light emitting elements 301, it is possible to suppress the output fluctuation of the charging voltage Vc1 at the timings Dy2, Dm2, and Dc2 when the pre-charging exposure portions on the photosensitive drums 215 of the process cartridges 225*y*, 225*m*, and 225*c* contact the charging rollers 216, respectively. As a result, the voltage generating circuit 601 is capable of continuously supplying a stable charging voltage Vc1 to the charging rollers 216 of the process cartridges 225*y*, 225*m*, and 225*c*, so that high-quality image formation with no density non-uniformity can be carried out.

In this embodiment, a constitution in which the stepwise rising control of the emitted light quantity of the light emitting element 301 of the pre-charging exposure device 227 is carried out in each of the process cartridges 225 was described. For example, in the case where the pre-charging exposure of a certain process cartridge 225 is performed, even when the light quantity of the light emitting element 301 is caused to abruptly rise from the turning-off state to the target light quantity, local potential non-uniformity generating on the photosensitive drum 215 is formed outside the image forming region in some instances. Specifically, this case corresponds to a case of the light emission control of the pre-charging exposure which is carried out at an earliest timing of a start of image formation in the constitution of this embodiment and which is for the photosensitive drum 215*y* of the process cartridge 225*y* which is the yellow station. In this case, there is no influence on the image formation, and therefore, the above-described stepwise rising control of the emitted light quantity of the light emitting element 301 of the pre-charging exposure device 227 is not necessarily required to be carried out. Similarly, also, when the light emitting element 301 of the pre-charging exposure device 227 is turned off, in some instances, the occurrence position of the local potential non-uniformity on the surface of the photosensitive drum 215 is positioned outside the image forming region. Specifically, this case corresponds to a case in which, of the photosensitive drums 215 of the process cartridges 225*y*, 225*m*, and 225*c* in which the charging voltage Vc1 is supplied from the voltage generating circuit 601, the photosensitive drum 215*c* of the process cartridge 225*c* of which an end of the image formation is latest is subjected to the turning-off control of the pre-charging exposure is carried out. In this case, the stepwise falling control of the emitted light quantity of the light emitting element 301 of the pre-charging exposure device 227 is not necessarily required to be carried out.

Further, as regards the process cartridge 225*k*, to the charging roller 216*k*, the charging voltage is applied from the high-voltage power source (voltage generating circuit) different from the high-voltage power source (voltage generating circuit) for other process cartridges 225*y*, 225*m*, and 225*c*. For that reason, even when the output fluctuation of the charging voltage supplied to the process cartridge 225*k* occurs, the output fluctuation does not have the influence on the background potentials of the photosensitive drums 215 of other process cartridges 225*y*, 225*m*, and 225*c*. Also, in the case of such a constitution, the stepwise rising control and the stepwise falling control of the light emitting element 301 of the pre-charging exposure device 227 are not necessarily required to be carried out.

Further, in this embodiment, the turning-on (light emission)/turning-off (lights-out) control of the light emitting element 301 of the pre-charging exposure device 227 during the image forming operation was described. For example, in order to suppress the potential non-uniformity generating on the surface of the photosensitive drum 215 due to the pre-charging exposure, the stepwise rising control and the stepwise falling control of the light emitting element 301 may also be carried out at the time on/turning-off control of the light emitting element 301 of the pre-charging exposure device 227 carried out for the purpose other than the image formation.

As described above, in this embodiment, the emitted light quantity of the light emitting element 301 of the pre-charging exposure device 227 is controlled so that the displacement amount of the surface potential of the photosensitive drum 215 before and after the pre-charging exposure becomes gentle. By this, the output fluctuation of the charging voltage by the fluctuation (load fluctuation) of the third potential of the photosensitive drum 215 can be suppressed to a minimum. As a result, in order to suppress the deposition of the transfer residual toner on the charging roller 216 in the constitution of the cleaner-less system and the generation of the drum ghost, the high-quality image formation free from the image density non-uniformity can be carried out. Particularly, in the color image forming apparatus with the constitution in which the power (voltage) is supplied from the common power source device to the plurality of charging members, the high-quality image formation free from the image density non-uniformity can be carried out.

As described above, according to this embodiment (embodiment 1), it is possible to suppress the fluctuation of the charging voltage with the displacement of the surface potential of the photosensitive drum due to the pre-charging exposure.

In the following, in an embodiment 2, stepwise rising control and stepwise falling control of the light emitting element of the pre-charging exposure device different from those in the above-described embodiment 1 will be described. Constitutions of the image forming apparatus and the pre-charging exposure device in this embodiment are similar to those in the embodiment 1, and the same devices and members are represented by the same reference numerals or symbols as those in the embodiment 1 and will be omitted from description in this embodiment.

[Photosensitive Characteristic of Photosensitive Drum]

FIG. 8 is a graph showing an example of an E-V curve showing a photosensitive characteristic of each of the photosensitive drums 215 of the process cartridges 225*y*, 225*m*, 225*c*, and 225*k*. In FIG. 8, the abscissa represents an exposure amount (exposure light quantity) E of the light emitting element 301 of the pre-charging exposure device 227, and the ordinate represents a surface potential V of the photosensitive drum 215. In the E-V curve of FIG. 8, in the case where the surface potential (potential after transfer) of the photosensitive drum 215 at the time of the end of the primary transfer step is V1, when the photosensitive drum surface is irradiated with light in an exposure light quantity E2 from the light emitting element 301 of the pre-charging exposure device 227, the surface potential (potential before the charging and after the exposure) of the photosensitive drum 215 is displaced to V2.

The E-V curve shown in FIG. 8 shows that the surface potential of the photosensitive drum 215 is attenuated (lowered) by increasing the exposure amount E of the light emitted from the light emitting element 301. Further, a high-potential portion where an absolute value of the surface potential of the photosensitive drum 215 is large is in an environment of a strong electric field and does not readily generate recombination of charge carriers (electron-hole pair) generated by the exposure with the light emitting element 301. For that reason, the surface potential of the photosensitive drum 215 is largely attenuated even in a small exposure amount E. On the other hand, a low-potential portion where the absolute value of the surface potential of the photosensitive drum 215 is small is in an environment of a weak electric field, and the charge carriers generated by the exposure with the light emitting element 301 are liable to cause recombination. For that reason, a degree of the attenuation of the surface potential of the photosensitive drum 215 is small even in a large exposure amount E. That is, when the discharge of the photosensitive drum 215 by the pre-charging exposure device 227 is performed, the surface potential of the photosensitive drum 215 has the following characteristic. The photosensitive drum 215 has a characteristic such that in a small (low) light quantity region in which the emitted light quantity of the light emitted from the light emitting element 301 is smaller (lower) than a predetermined light quantity, a fluctuation of the surface potential of the photosensitive drum 215 relative to a displacement amount of the emitted light quantity becomes large. Further, the photosensitive drum 215 has a characteristic such that a large (high) light quantity region in which the emitted light quantity of the light emitted from the light emitting element

301 is larger (higher) than the predetermined light quantity, the fluctuation of the surface potential of the photosensitive drum 215 relative to the displacement amount of the emitted light quantity becomes small.

[Light Emission/Lights-Cut Control of Pre-Charging Exposure Device]

Next, a light emission control method of the pre-charging exposure device 227 in this embodiment will be described using FIG. 9. FIG. 9 is a timing chart showing states of the pre-charging exposure devices 227, the photosensitive drums 215, the charging voltage, and the like during the printing operation of the color laser beam printer 201 of this embodiment. In FIG. 9, the abscissa represents a time. The emitted light quantity of the pre-charging exposure device 227 shown in FIG. 9 by the abscissa, and the timing chart of the surface potential of the photosensitive drum 215 in the neighborhood of the pre-charging exposure portion, the output waveform of the charging voltage, and the like are similar to those described above with reference to FIG. 7 and will be omitted from description of a way of understanding.

In this embodiment, when the light emission control of the light emitting element 301 of the pre-charging exposure device 227 in the process cartridge 225 is carried out, the emitted light quantity 101 of the light emitting element 301 is controlled depending on the E-V curve characteristic, which is a photosensitive characteristic of the photosensitive drum 215 described above. For that reason, in this embodiment, the stepwise rising control such that the light quantity of the light emitting element 301 is gently increased in the small light quantity region and is abruptly increased in the large light quantity region is carried out. By this, in FIG. 9, as shown by 102*y*, 102*m*, 102*c*, and 102*k*, it is possible to perform discharge without causing partially and abruptly potential fluctuation of the surface potential of the photosensitive drum 215. In the stepwise rising control in the embodiment 1, the light quantity of the light emitting element 301 was linearly controlled so that the light quantity changes in a certain amount and is proportional to a time. On the other hand, in the stepwise rising control in this embodiment (embodiment 2), compared with the embodiment 1, the fluctuation of the charging voltage at each of the timings Dy1, Dm1, and Dc1 when the pre-charging exposure portion on the photosensitive drum 215 of the process cartridge 225 reaches the contact portion of the photosensitive drum 215 with the charging roller 216 can be further suppressed.

Further, also, in the stepwise falling control in which the light emitting element 301 of the pre-charging exposure device 227 is turned off, similarly as the time of the light emission control of the light emitting element 301, the turning-off control of the light emitting element 301 is carried out depending on the E-V curve characteristic which is the photosensitive characteristic of the photosensitive drum 215. In this embodiment, the stepwise falling control such that the light quantity of the light emitting element 301 is abruptly decreased in the large light quantity region and is gently decreased in the small light quantity region is carried out, so that the development amount of the surface potential of the photosensitive drum 215 can be suppressed.

FIG. 10 is a graph for illustrating an example of the above-described stepwise rising control of the emitted light quantity of the light emitting element 301. In FIG. 10, the abscissa represents a time, and the ordinate represents the emitted light quantity of the light emitting element 301 of the pre-charging exposure device 227. In the stepwise rising control shown in FIG. 10, in the small light quantity region in which the photosensitive characteristic of the photosensitive drum 215 at a timing when the light emission is started is more sensitive, the emitted light quantity of the light emitting element 301 of the pre-charging exposure device 227 is increased stepwise. On the other hand, in the large light quantity region in which the photosensitive characteristic becomes insensitive, the emitted light quantity of the light emitting element 301 is abruptly increased. By carrying out such stepwise rising control, it is possible to shorten a rising time in which the emitted light quantity of the light emitting element 301 of the pre-charging exposure device is increased to the target light quantity while suppressing the fluctuation of the charging voltage due to the discharge by the pre-charging exposure device 227.

As described above, in this embodiment, the emitted light quantity of the light emitting element 301 of the pre-charging exposure device 227 is controlled depending on the photosensitive characteristic of the photosensitive drum 215 so that the displacement amount of the surface potential of the photosensitive drum 215 before and after the pre-charging exposure becomes gentle. By this, the output fluctuation of the charging voltage by the fluctuation (load fluctuation) of the third potential of the photosensitive drum 215 can be further reduced. As a result, in order to suppress the deposition of the transfer residual toner on the charging roller 216 in the constitution of the cleaner-less system and the drum ghost, the high-quality image formation free from the image density non-uniformity can be carried out. Particularly, in the color image forming apparatus with the constitution in which the power (voltage) is supplied from the common power source device to the plurality of charging members, the high-quality image formation free from the image density non-uniformity can be carried out.

According to the present invention, it is possible to suppress the fluctuation of the charging voltage with the displacement of the surface potential of the photosensitive drum due to the pre-charging exposure.

As described above, according to this embodiment, the fluctuation of the charging voltage with the displacement of the surface potential of the photosensitive drum due to the pre-charging exposure can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-042223 filed on Mar. 17, 2022, which is hereby incorporated by reference herein in its entirety.

What is claimed is:

1. An image forming apparatus comprising:

a first image forming portion including a first photosensitive member, a first charging member configured to electrically charge a surface of the first photosensitive member, a first developing portion configured to develop an electrostatic latent image formed on the first photosensitive member to form a toner image, a first transfer portion configured to transfer the toner image from the first photosensitive member onto a toner image receiving member, and a first discharging portion including a first light emitting element and configured to discharge the surface of the first photosensitive member by irradiating the surface of the first photosensitive member with light emitted from the first light emitting element;

a second image forming portion including a second photosensitive member, a second charging member configured to electrically charge a surface of the second photosensitive member, a second developing portion configured to develop an electrostatic latent image formed on the second photosensitive member to form a toner image, a second transfer portion configured to transfer the toner image from the second photosensitive member onto a toner image receiving member, and a second discharging portion including a second light emitting element and configured to discharge the surface of the second photosensitive member by irradiating the surface of the second photosensitive member with light emitted from the second light emitting element;

a power source portion configured to apply a charging voltage to the first charging member and the second charging member; and a controller configured to control the first discharging portion and the second discharging portion, wherein the power source portion is constituted so that when the power source portion applies the charging voltage to the first charging member, the charging voltage is also applied to the second charging member, and wherein the controller carries out control so that an emitted light quantity of the first light emitting element is changed from a first light quantity to a second light quantity greater than the first light quantity and an emitted light quantity of the second light emitting element is changed from a third light quantity to a fourth light quantity greater than the third light quantity.

2. An image forming apparatus according to claim 1, wherein the first image forming portion is provided upstream of the second image forming portion with respect to a movement direction of the toner image receiving member, and wherein the controller carries out control so that an emitted light quantity of the light emitting element of the second discharging portion of the second image forming portion is not changed stepwise.

3. An image forming apparatus according to claim 2, wherein the first light quantity is a light quantity in a turning-off state of the first light emitting element.

4. An image forming apparatus according to claim 3, wherein in a case that discharge of the first photosensitive member of the first image forming portion is made, the controller carries out control so that the emitted light quantity of the first light emitting element is increased stepwise from the light quantity in the turning-off state to a target light quantity.

5. An image forming apparatus according to claim 4, wherein the controller carries out control so that the emitted light quantity of the first light emitting element is increased with a certain light quantity.

6. An image forming apparatus according to claim 4, wherein the controller carries out control so that the emitted light quantity is moderately increased more in a small-light quantity region in which the emitted light quantity of the first light emitting element is less than a predetermined light quantity than in a large-light quantity region in which the emitted light quantity of the first light emitting element is greater than the predetermined light quantity.

7. An image forming apparatus according to claim 6, further comprising a plurality of image forming portions different from the first image forming portion, wherein discharge starting timings by discharging portions of the image forming portions are different from each other.

8. An image forming apparatus according to claim 6, further comprising a plurality of image forming portions different from the first image forming portion, wherein the controller carries out control so that discharge by each of discharging portions of the image forming portions is started depending on a timing when image formation in an associated one of the image forming portions is started.

9. An image forming apparatus according to claim 1, wherein the first discharging portion is provided downstream of the first transfer portion and upstream of the first charging portion with respect to a rotational direction of the first photosensitive member, and wherein the second discharging portion is provided downstream of the second transfer portion and upstream of the second charging portion with respect to a rotational direction of the second photosensitive member.

10. An image forming apparatus according to claim 1, wherein the charging voltage applied to the first charging member and the charging voltage applied to the second charging member have the same output value.

11. An image forming apparatus comprising:

a first image forming portion including a first photosensitive member, a first charging member configured to electrically charge a surface of the first photosensitive member, a first developing portion configured to develop an electrostatic latent image formed on the first photosensitive member to form a toner image, a first transfer portion configured to transfer the toner image from the first photosensitive member onto a toner image receiving member, and a first discharging portion including a first light emitting element and configured to discharge the surface of the first photosensitive member by irradiating the surface of the first photosensitive member with light emitted from the first light emitting element;

a second image forming portion including a second photosensitive member, a second charging member configured to electrically charge a surface of the second photosensitive member, a second developing portion configured to develop an electrostatic latent image formed on the second photosensitive member to form a toner image, a second transfer portion configured to transfer the toner image from the second photosensitive member onto a toner image receiving member, and a second discharging portion including a second light emitting element and configured to discharge the surface of the second photosensitive member by irradiating the surface of the second photosensitive member with light emitted from the second light emitting element;

a power source portion configured to apply a charging voltage to the first charging member and the second charging member; and a controller configured to control the first discharging portion and the second discharging portion, wherein the power source portion is constituted so that when the power source portion applies the charging voltage to the first charging member, the charging voltage is also applied to the second charging member, and wherein the controller carries out control so that an emitted light quantity of the first light emitting element is changed from a first light quantity to a second light quantity less than the first light quantity and an emitted light quantity of the second light emitting element is changed from a third light quantity to a fourth light quantity less than the third light quantity.

12. An image forming apparatus according to claim 11, wherein the first image forming portion is provided upstream of the second image forming portion with respect to a movement direction of the toner image receiving member, and wherein the controller carries out control so that an emitted light quantity of the light emitting element of the second discharging portion of the second image forming portion is not changed stepwise.

13. An image forming apparatus according to claim 12, wherein the first light quantity is a light quantity in a turning-off state of the first light emitting element.

14. An image forming apparatus according to claim 13, wherein in a case that discharge of the first photosensitive member of the first image forming portion is ended, the controller carries out control so that the emitted light quantity of the first light emitting element is decreased stepwise from a target light quantity to the light quantity in the turning-off state.

15. An image forming apparatus according to claim 14, wherein the controller carries out control so that the emitted light quantity of the first light emitting element is decreased with a certain light quantity.

16. An image forming apparatus according to claim 14, wherein the controller carries out control so that the emitted light quantity is moderately decreased more in a small-light quantity region in which the emitted light quantity of the first light emitting element is less than a predetermined light quantity than in a large-light quantity region in which the emitted light quantity of the first light emitting element is greater than the predetermined light quantity.

17. An image forming apparatus according to claim 16, further comprising a plurality of image forming portions different from the first image forming portion, wherein discharge ending timings by discharging portions of the image forming portions are different from each other.

18. An image forming apparatus according to claim 16, further comprising a plurality of image forming portions different from the first image forming portion, wherein the controller carries out control so that discharge by the first discharging portion in the first image forming portion is ended depending on a timing when image formation in each of the image forming portions is ended.

19. An image forming apparatus according to claim 11, wherein the first discharging portion is provided downstream of the first transfer portion and upstream of the first charging portion with respect to a rotational direction of the first photosensitive member, and wherein the second discharging portion is provided downstream of the second transfer portion and upstream of the second charging portion with respect to a rotational direction of the second photosensitive member.

20. An image forming apparatus according to claim 11, wherein the charging voltage applied to the first charging member and the charging voltage applied to the second charging member have the same output value.

* * * * *